United States Patent
Smith et al.

(10) Patent No.: US 11,671,320 B2
(45) Date of Patent: Jun. 6, 2023

(54) VIRTUAL SUPERVISORY CONTROL AND DATA ACQUISITION (SCADA) AUTOMATION CONTROLLER

(71) Applicant: UT-Battelle, LLC, Oak Ridge, TN (US)

(72) Inventors: Jared M. Smith, Knoxville, TN (US); Jordan A. Johnson, Knoxville, TN (US); Brian Weber, Alexandria, VA (US); Christopher R. Hathhorn, Knoxville, TN (US); Benjamin T. McDaniel, Deer Park, NY (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/506,969

(22) Filed: Oct. 21, 2021

(65) Prior Publication Data

US 2022/0131748 A1    Apr. 28, 2022

Related U.S. Application Data

(60) Provisional application No. 63/094,943, filed on Oct. 22, 2020.

(51) Int. Cl.
| | | |
|---|---|---|
| *G06F 15/173* | (2006.01) | |
| *H04L 41/0816* | (2022.01) | |
| *H04L 41/0695* | (2022.01) | |
| *H04L 41/0668* | (2022.01) | |
| *H04L 41/082* | (2022.01) | |
| *G06F 15/16* | (2006.01) | |

(52) U.S. Cl.
CPC ...... *H04L 41/0816* (2013.01); *H04L 41/0668* (2013.01); *H04L 41/0695* (2013.01); *H04L 41/082* (2013.01)

(58) Field of Classification Search
CPC ............. H04L 41/0816; H04L 41/0668; H04L 41/0695; H04L 41/082; H04L 41/40; Y04S 40/00
USPC ........................................................ 709/224
See application file for complete search history.

(56) References Cited

U.S. PATENT DOCUMENTS

| | | | |
|---|---|---|---|
| 2018/0284758 A1* | 10/2018 | Cella | G16Z 99/00 |
| 2018/0373609 A1* | 12/2018 | Beerens | G06F 11/3027 |
| 2021/0157312 A1* | 5/2021 | Cella | G05B 23/0264 |

OTHER PUBLICATIONS

"SCADA Redundancy and Automatic Failover", online, VTScada by Trihedral, internet, <https://www.vtscada.com/redundancy-and-automatic-failover/>, printed Mar. 23, 2022.

(Continued)

*Primary Examiner* — Karen C Tang
(74) *Attorney, Agent, or Firm* — Scully, Scott, Murphy & Presser, P.C.

(57) ABSTRACT

One or more virtual supervisory control and data acquisition (SCADA) controllers are provided. The virtual SCADA controller(s) may be deployed upon a detection of a failure of a physical SCADA controller. An on-site module may detect failure including a security breach which causes the physical SCADA controller to be disconnected from a network and the virtual SCADA controller(s) to take over control. The virtual SCADA controller(s) may be on-site or off-site.

14 Claims, 14 Drawing Sheets

(56) References Cited

OTHER PUBLICATIONS

"VTScada by Trihedral's Post", online, Linkedin, internet, <https://www.linkedin.com/posts/vtscada-by-trihedral_vtscada-software-powering-suffolk-county-activity-6646491860443414529-KZWc>, printed Mar. 23, 2022.
"Cloud based SCADA for plant automation", online, Data-Command® Cloud-Based Solutions, internet, <https://www.data-command.com/cloud-applications-industrial-automation/cloud-based-scada-for-plant-automation/, printed Mar. 23, 2022.
Hand, A., "Scalable, Current, Real-Time SCADA in the Cloud", online, AutomationWorld, internet, <https://www.automationworld.com/products/control/blog/13317516/scalable-current-realtime-scada-in-the-cloud>, printed Jan. 10, 2022.
"AnyViz—The cloud for your PLC", online, AnyViz, internet, <https://www.anyviz.io/>, printed Jan. 10, 2022.
"IPAliasRedundancy", Sep. 28, 2018, online, Acselerator RTAC® Projects, internet, <https://cdn.selinc.com/assets/Literature/Miscellaneous/RTAC%20Library%20Extension%20Manuals/IPAliasRedundancy.pdf?v=20181019-201939>, printed Jan. 10, 2022.
Hegazy, T. et al., "Industrial Automation as a Cloud Service", IEEE Transactions on Parallel and Distributed Systems, Oct. 1, 2015, pp. 2750-2763, vol. 26, No. 10.
"Arcade.PLC", online, Arcade, internet, <https://arcade.embedded.rwth-aachen.de/doku.php?id=arcade.plc>, printed Jan. 10, 2022.
Givehchi, O. et al., "Control-as-a-service from the cloud: A case study for using virtualized PLCs", 10th IEEE Workshop on Factory Communication Systems (WFCS 2014), 2014, pp. 1-4.
Goldschmidt, T. et al., "Cloud-Based Control: A Multi-tenant, Horizontally Scalable Soft-PLC", IEEE 8th International Conference on Cloud Computing, 2015, pp. 909-916.
"Depth-first search", online, Wikipedia, internet, <https://en.wikipedia.org/wiki/Depth-first search>, printed Jan. 10, 2022.

\* cited by examiner

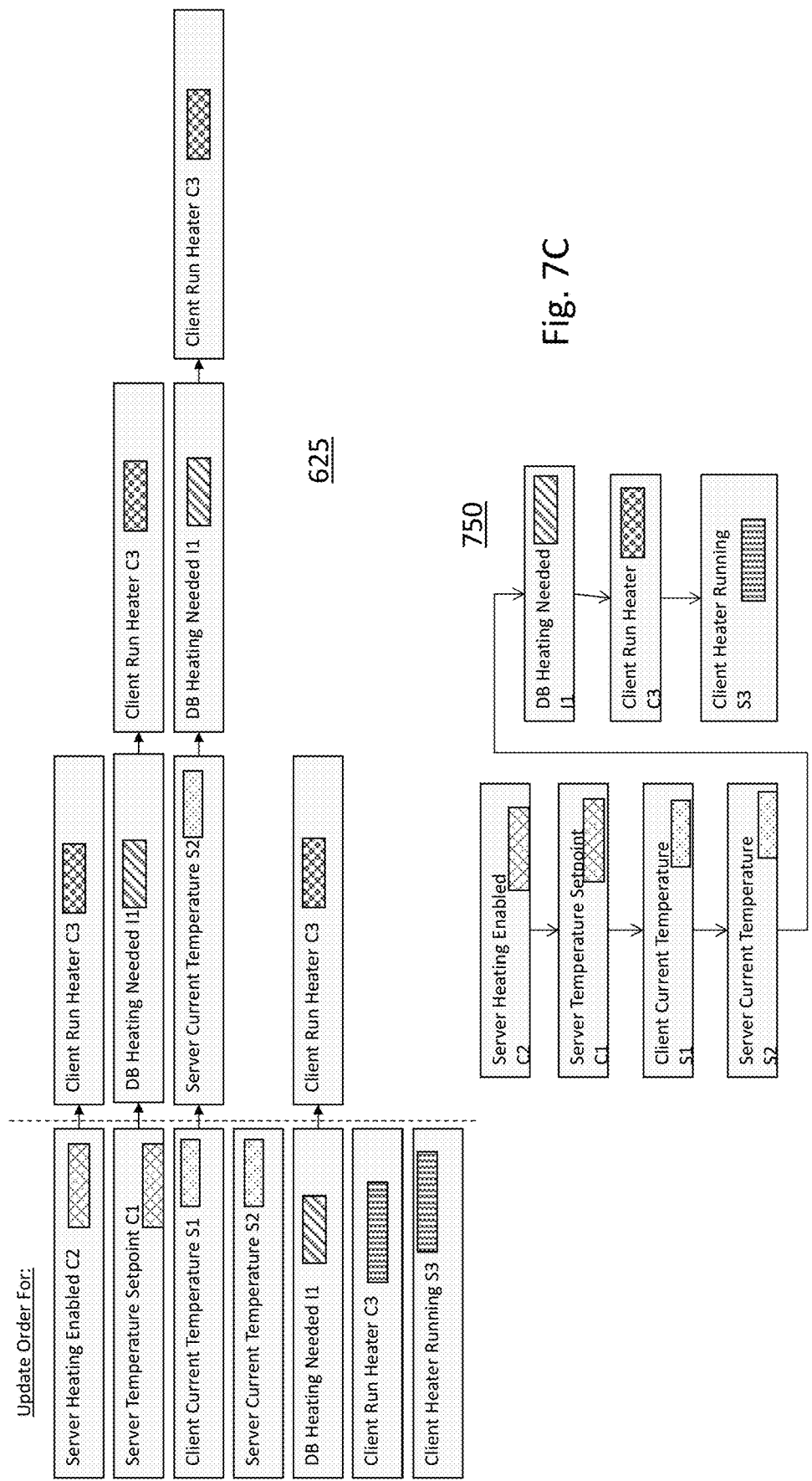

630

VIRTUAL SUPERVISORY CONTROL AND DATA ACQUISITION (SCADA) AUTOMATION CONTROLLER

CROSS-REFERENCE TO RELATED APPLICATIONS

This application claims the benefit of and priority to U.S. Provisional Application Ser. No. 63/094,943 filed on Oct. 22, 2020.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

FIELD OF THE DISCLOSURE

This disclosure relates to faults of an automation controller. More particularly, the disclosure relates to deployment of virtual automation controller(s) upon a detection of a fault.

BACKGROUND

Automation controllers are used in many different types of information technology systems. The automation controller, such as a real-time automation controller (RTACs) serves as protocol aggregation, analysis and coordination. The system may have portions located in different substations and transmission facilities. The RTACs typically control other components such as programmable logic controllers (PLCs), which in turn are responsible for controlling downstream components.

These systems may be part of a utility system. For example, a typical system may comprise a monitoring device at a control center such as a utility control center. An operator/user ("operator") can monitor the overall system's operation via a dashboard on the monitoring device, such as a computer. The control center may be in communication with multiple substations via a network, e.g., utility network. At each substation, the system comprises the RTAC as described above, a physical switch, which routes the data input and output from the RTAC to downstream devices. The system also comprises one or more intelligent electronic devices (IEDs) such as the PLCs, actuators, sensors. The IEDs process the information from the RTAC and control the downstream physical environment such as changing the water pressure, temperature, etc. The components in the substation may communicate with each other via an operational technology (OT) network.

The RTACs in this type of system may be a prime target for adversaries for tampering or compromising the overall system.

When the RTAC has a failure (fault), the operator at the control center may not be able to communicate with the substation (components). To identify and fix the fault, the operator must send someone to the substation. During this time, the RTAC may not be updating information to the IEDs and the required physical world changes may not be made. The substation may be taken offline while the fault is being repaired. The RTAC may need to be replaced. However, physically replacing the controller may disturb information which could hinder forensics. Alternately, a technician may leave the RTAC in place and simply fix the fault. However, there is a risk of the same fault re-occurring. There is also a risk of destroying the forensic data. Either way, there is a delay between the time the fault occurred and the system being fully up to speed again.

Providers typically ensure resilience of these systems by building—in several additional layers of failover such as by adding physical SCADA devices (such as other RTACs) to take over when, either adversary-caused or simply mechanically-induced faults occurs. However, providing physical devices for failover in the case of the RTACs is not only expensive, but also requires manual intervention to install failover device, investigate and remediate faults, and bring the remediated device back online.

SUMMARY

Accordingly, disclosed is an apparatus which may comprise a memory, a first communication interface and a processor. The memory may store a controller module. The first communication interface may be configured to connect to a first port of a network routing device, to connect the apparatus to an operational technology (OT) network. When a failure associated with a physical supervisory control and data acquisition (SCADA) controller is detected, the apparatus may be configured to receive control information from a monitoring device, transmit information to two or more intelligent-electronic devices (IEDs) via the OT network and transmit information to the monitoring device. The processor, when executing the controller module may be configured to receive state information, respectively, from the two or more intelligent-electronic devices (IEDs) via the OT network, determine an update order for updating the state information, update the state information in a central value store in the memory and any dependent information based on the determined update order; and transmit first information to the monitoring device based on the updated state information in the central value store in response to a request from the monitoring device or second information to at least one of the two or more IEDs.

In an aspect of the disclosure, the memory may further comprise different configuration information. The different configuration information may comprise first configuration information, second configuration information and third configuration information. The first configuration information may comprise network address identifiers for each IED and a first module, port number and protocol for each IED. The first module may be accessed by the monitoring device. The second configuration information may comprise a mapping identifying the relationship between different information including information associated with the first module and information associated with one or more second modules or with the central value store. The third configuration information may comprise calculations associated with the state information or the control information and transformations specific to a protocol.

In an aspect of the disclosure, the control module may comprise a parser module. When the parser module is executed by the processor, the processor may be configured to analyze the first configuration information and determine a number of second modules to execute. The number of second modules may equal a number of different transmission protocols associated with the IEDs.

In an aspect of the disclosure, the controller module may further comprise. a rules engine configured to analyze the second configuration to determine the update order. In an aspect of the disclosure, there are a plurality of updated orders, one defined update order for each piece of state information.

In an aspect of the disclosure, when the rules engine is executed by the processor, the processor may be configured to update the state information received from the IEDs one at a time in one or more of the plurality of defined update orders and using the third configuration information.

In an aspect of the disclosure, certain of the updated state information may be transferred to the first module. In this aspect of the disclosure, the monitoring device may request the updated state information and in response, the processor, when executing the first module, may transmit the first information to the monitoring station based on the certain updated state information.

In an aspect of the disclosure, certain updated state information may be transferred to the appropriate second module for transmission to a corresponding IED as needed.

In an aspect of the disclosure, when the processor executes the first module, the processor may be configured to receive control information from the monitoring device and add to an update queue. In this aspect, upon receipt of control information, the processor may execute the rules engine to update the state information based on the control information using a selected update order from among the plurality of update orders based on the received control information. Further, certain updated state information (based on the control information) may be transferred to the appropriate second module for transmission to a corresponding IED as needed.

In an aspect of the disclosure, the apparatus may further comprise a second communication interface. The second communication interface may be configured to connect to a span or a tap port in the network routing device to receive state information from the IEDs and updated state information from the physical SCADA controller. When a failure associated with the physical SCADA controller is detected, the apparatus may be configured to uninterruptedly take over the control of the IEDs based on the state information from the IEDs and control information from the monitoring device, when the failure is detected.

Also disclosed is a system which may comprise a reprogrammable network-routing device, a fault-monitoring module and a network-manager module. The reprogrammable network-routing device maybe connected to a physical supervisory control and data acquisition (SCADA) controller and two or more intelligent-electronic devices (IEDs). The physical SCADA controller and the IEDs may be members of an operational technology (OT) network. The fault-monitoring module may be configured to tap into a port of the reprogrammable network-routing device to detect a failure of the physical SCADA controller. The network-manager module may be configured to decouple the physical SCADA controller from the IEDs by reprogramming the reprogrammable network-routing device and control the reprogrammable network-routing device such that bidirectional communication between the IEDs and a controller module is enabled.

In an aspect of the disclosure, the failure of the physical SCADA controller may be detected based at least one of a heartbeat from the physical SCADA controller, state information from the IEDs, and updated state information from the physical SCADA.

In an aspect of the disclosure, the controller module may be configured to tap into a port of the reprogrammable network-routing device to receive the state information from the physical controller and the IEDs and control information from a monitoring device prior to a detection of failure. The controller module may be configured to calculate its own updated state information from the state information and the control information. When the updated state information received from the physical SCADA controller and the calculated own updated state information is different, the fault-monitoring module may detect a failure. The network-manager module may instruct the controller modules to uninterruptedly take over control of the IEDs based on the state information from the IEDs determined by the controller module when the failure is detected.

In an aspect of the disclosure, the failure may be detected based on different techniques.

In an aspect of the disclosure, an alert may be generated and sent to a monitoring device in a monitoring station when a failure is detected. In an aspect of the disclosure, an instruction is received from a monitoring device in response to the received alert to cause the controller module to take over control of the IEDs.

In an aspect of the disclosure, the fault-monitoring module and the network-manager module may be members of a control network. The control network may be different from the OT network.

In an aspect of the disclosure, the system may be part of a utility.

BRIEF DESCRIPTION OF THE DRAWINGS

FIG. 7C illustrates an example of master safe update order and individual node update orders for each node in accordance with aspects of the disclosure.

DETAILED DESCRIPTION

In accordance with aspects of the disclosure, instead of or in addition to having redundant or multiple physical controllers (such as RTACs) onsite, such as at a substation 106, the failover system has a virtual controller 100 (also referred to herein as a virtual SCADA controller or vSCADA). The virtual SCADA controller 100 may or may not be onsite (at the substation 106). Examples of the substations include power plants 106A, commercial building 106B or neighborhood 106C. Onsite refers to herein to mean the same location as the physical controller 105 and the downstream components which are controlled by the physical controller 105. The virtual SCADA controller 100 may be distributed across many physical locations.

Figure 1:
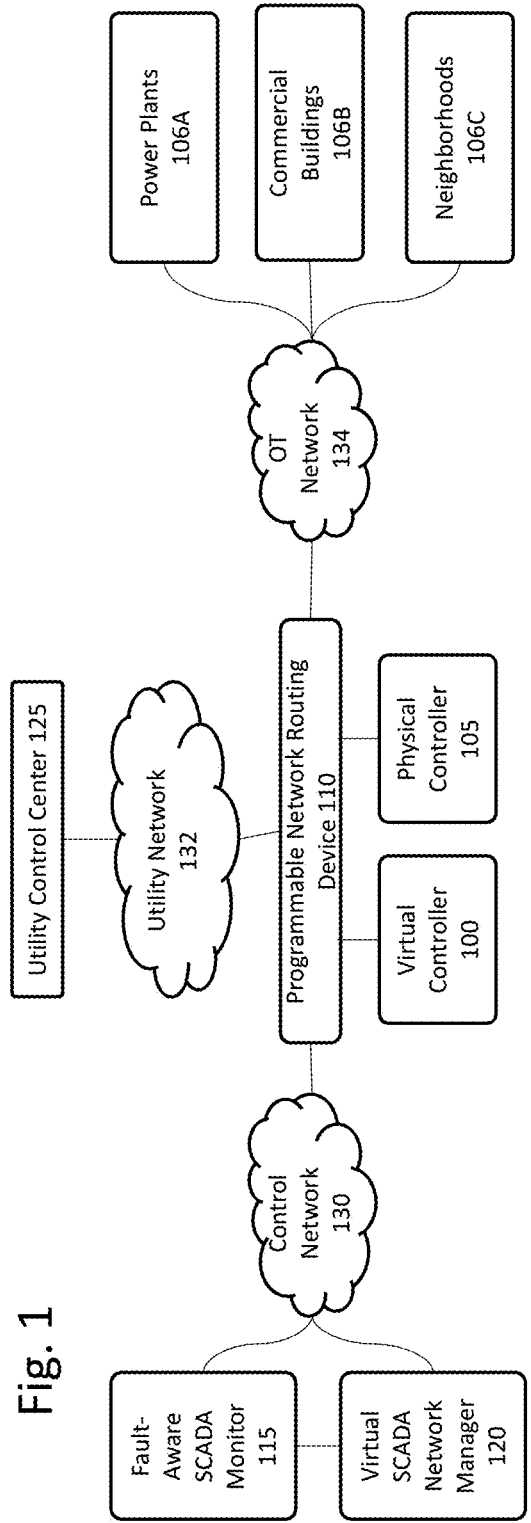
FIG. 1 illustrates a system in accordance with aspects of the disclosure.

FIG. 1 illustrates an example of a failover system in accordance with aspects of the disclosure. Although in FIG. 1, the system is shown in the context for a utility system, the disclosure is not limited to failover for a utility system and the virtual SCADA controller 100 may be used in other IT systems.

Components with the system communicate via a SCADA network. The SCADA network may have three sub-networks (networks): control network 130, utility network 132 and OT network 134. These networks 130, 132, 134 may be wired networks. In some aspects of the disclosure, these networks 130, 132, 134 may be secure networks and transmissions may be encrypted. In some aspects of the disclosure, the networks 130, 132, 134 may be wireless networks. In some aspects, the networks 130, 132, 134 may be cellular networks.

The utility control center 125 may comprise a monitoring device. The monitoring device may comprise a processor such as a CPU and a display. The display may display a dashboard depicting information regarding the substations. The utility control center 125 may control the components of the substations by transmitting control information (instructions) via the utility network 132 to the physical controller 105. The utility control center 125 may also receive information associated with state information from the physical controller 105. When a failover occurs, the utility control center 125 may control the components of the substations by transmitting control information via the utility network 132 to the virtual SCADA controller 100. Similarly, when the failover occurs, the utility control center 125 may also receive information associated with the state information from the virtual SCADA controller 100.

The system includes a programmable network routing device 110. In an aspect of the disclosure, the programmable network routing device 110 may be a software defined network (SDN) switch. The SDN switch may be an Ethernet switch capable of enabling and disabling ports and redirecting network traffic on command. SDN switches are available from Schweitzer Engineering Laboratories (SEL). Although for illustrative purposes the programmable network routing device 110 is shown separate from the substations (e.g., power plants 106A, commercial buildings 106B, and neighborhoods 106C), the programmable network routing device 110 may be located within the substation. An SDN switch may comprise a plurality of ports. The ports may enable bi-directional communication. The ports may also be TAP or SPAN ports, which enable listening to traffic without impacting the same. The physical controller 105 may be connected to one of the ports in the programmable network routing device 110. Similarly, the IEDs 200 and the utility control center 125 may be connected to a port, respectively, of the programmable network routing device 110.

The system also comprises a fault-aware SCADA monitor 115 and a virtual SCADA network manager 120. The fault-aware SCADA monitor 115 may be configured to detect faults in the substation, e.g., fault in the physical controller 105 and IEDs 200 (such as the PLCs). In an aspect of the disclosure, the fault-aware SCADA monitor 115 is executed by a processor. For example, the processor may be a CPU. In other aspects, the processor may be a microcontroller or microprocessor or any other processing hardware such as a FPGA. The processor may be configured to execute one or more programs stored in a memory to execute the functionality described herein. The fault-aware SCADA monitor 115 may be connected to a port of the programmable network routing device 110. In an aspect of the disclosure, this port is a TAP or SPAN port. This way, the fault-aware SCADA monitor 115 receives all traffic sent via the utility network 132 (from/to the utility control center 125) and via the OT network 134 (from/to the physical controller 105 and other onsite components). The fault-aware SCADA monitor 115 may also receive traffic from the virtual SCADA controller 100.

The virtual SCADA network manager 120 may be configured to reprogram the programmable network routing device 110 based on instructions from the fault-aware SCADA monitor 115 via the control network 130 or from instructions from the utility control center 125. In an aspect of the disclosure, the virtual SCADA network manager 120 may be executed by a processor. For example, the processor may be a CPU. In other aspects, the processor may be a microcontroller or microprocessor or any other processing hardware such as a FPGA. The processor may be configured to execute one or more programs stored in a memory to execute the functionality described herein. In an aspect of the disclosure, the processor may be the same as the processor that executes the fault-aware SCADA monitor 115. However, in other aspects, the processors may be different. The virtual SCADA network manager 120 may be connected to a control port of the programmable network routing device 110.

Although for illustrative purposes the fault-aware SCADA monitor 115 and virtual SCADA network manager 120 are shown separate from the substations (e.g., power plants 106A, commercial buildings 106B, and neighborhoods 106C), the fault-aware SCADA monitor 115 and virtual SCADA network manager 120 may be located within the substation(s).

In an aspect of the disclosure, the virtual SCADA controller 100 may be connected to one or more ports of the programmable network routing device 110. In an aspect of the disclosure, the system may be used for hot swapping out the physical controller 105 with the virtual SCADA controller 100. In this aspect of the disclosure, the virtual SCADA controller 100 may be connected to a TAP or SPAN port of the programmable network routing device 110 to continuously monitor traffic without impacting the same and another port of the programmable network routing device 110 (which is bi-directional) and reconfigurable. When the physical controller 105 is operational and operating normally, this port may be disabled by the virtual SCADA network manager 120 (virtual SCADA controller 100 listens to the traffic via the TAP OR SPAN port), however, when the fault-aware SCADA monitor 115 detects a fault, the virtual SCADA network manager 120 may enable the port for bi-directional communication with the virtual SCADA 100 and other components on the network(s). The hot swap will allow replacement of the faulty physical controller while it is triaged, investigated, and recovered. In an aspect of the disclosure, the port in which the physical controller 105 is connected to may be disabled by the virtual SCADA network manager 120 in response to the fault determination. In some aspects, the control of the switching may be without a need for an operator intervention.

In an aspect of the disclosure, the system may be used for cold swapping out the physical controller 105 with the virtual SCADA controller 100. In this aspect, the virtual SCADA controller 100 may only be connected to one port of the programmable network routing device 110. When the physical controller 105 is operational and operating normally, this port may be disabled by the virtual SCADA network manager 120, however, when the fault-aware SCADA monitor 115 detects a fault, the virtual SCADA network manager 120 may enable the port for bi-directional communication with the virtual SCADA 100.

In an aspect of the disclosure, there may be one virtual SCADA controller 100 for each physical controller 105 (e.g., a one-to-one correspondence). However, in other aspects of the disclosure, there may be more than one virtual SCADA controller 100 for a physical controller 105. In some aspects, the number of virtual SCADA controllers 100 for a physical controller 105 may be based on a current demand of the system. In other aspects of the disclosure, a honeypot version of the virtual SCADA controller 100 may be used in conjunction with another version to observe how adversaries interact with it and prevent future attacks without risking damage to the physical controllers 105.

In an aspect of the disclosure, the virtual SCADA controller 100 is isolated by the physical infrastructure, which prevents it from being physically compromised and gives responders more time to replace the physical controllers 105 without affecting consumers. However, if a virtual SCADA controller 100 is compromised, it may be quickly replaced by a fresh copy of the configurations, e.g., starting up a new virtual SCADA controller 100.

Figure 2:
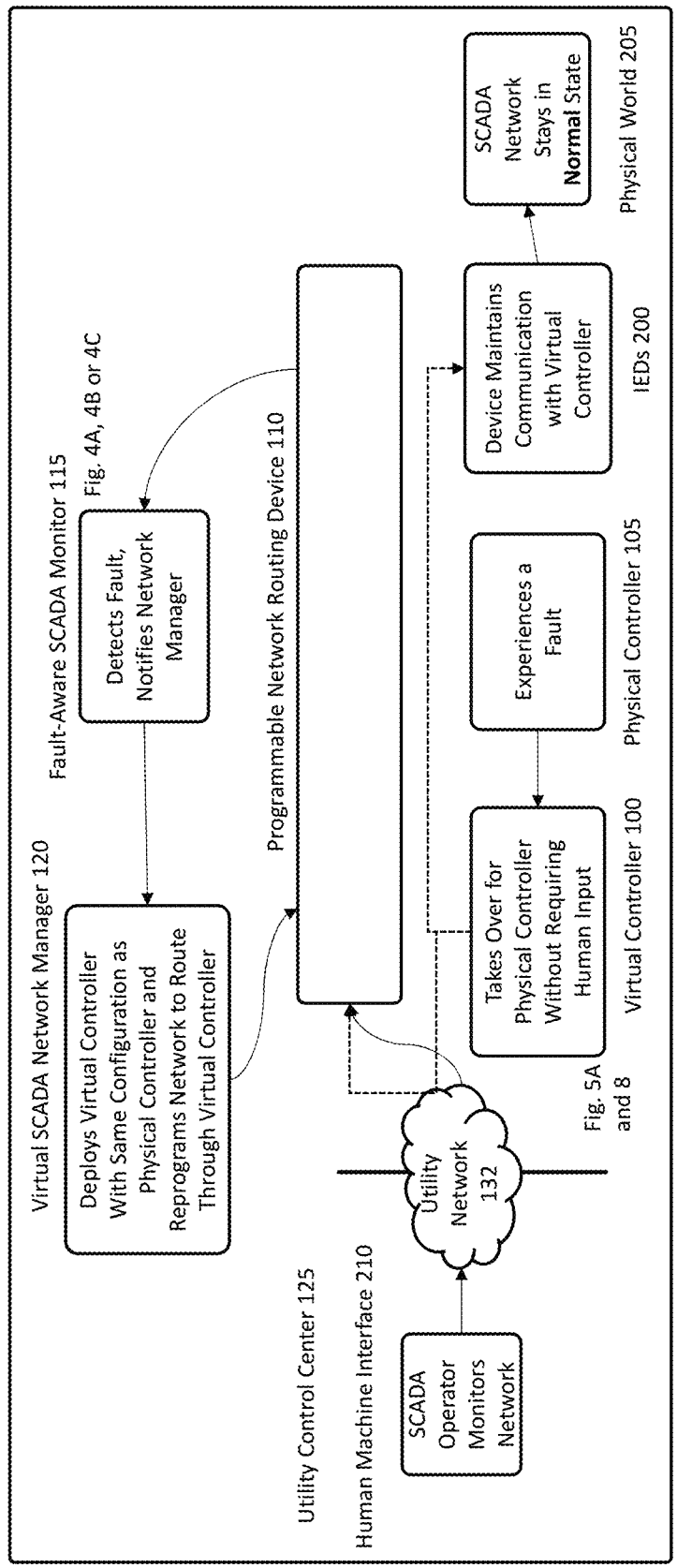
FIG. 2 illustrates the system when a fault occurs in the physical controller in accordance with aspects of the disclosure.

FIG. 2 illustrates an example when a fault occurs in the physical controller 105 in accordance with aspects of the disclosure. The operator (e.g., SCADA operator) monitors the network, e.g., substations, at the utility control center 125. The monitoring may use a monitoring device (e.g., human machine interface 210 or dashboard on a processor). Traffic is sent to the utility control center 125 via the utility network 132. When a fault or failure is experienced in the physical controller 105, the virtual SCADA controller 100 may take over for the physical controller 105 without requiring human input or interaction. For example, the fault-aware SCADA monitor 115 detects the fault in the physical controller 105 and notifies the virtual SCADA network manager 120. The detection of the fault is described in FIGS. 4A-4C. The virtual SCADA network manager 120 deploys the virtual SCADA controller 100 (having the same virtual configuration) as the physical controller 105 by reprogramming the programmable network routing device 110 to route traffic through the virtual SCADA controller 100. Since the traffic is running through the virtual SCADA controller 100, the IEDs 200 may remain unaffected by the fault in the physical controller 105 and maintains communication with the virtual SCADA controller 100. The IEDs 200 functionality is unaffected by the fault. As such the physical world, e.g., pressure, temperature and other endpoint controls such as valve status/control, breaker status/control, current and voltage are maintained in a normal state. The IEDs may include PLCs, RTUs, PMUs, meters, etc.

Figure 3A:
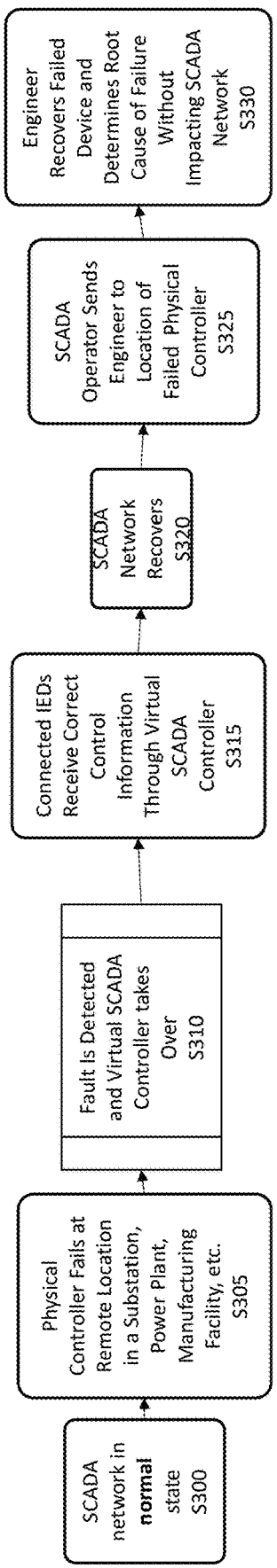
FIG. 3A and FIG. 3B illustrate flow charts of the failover method in accordance with aspects of the disclosure.
Figure 3B:
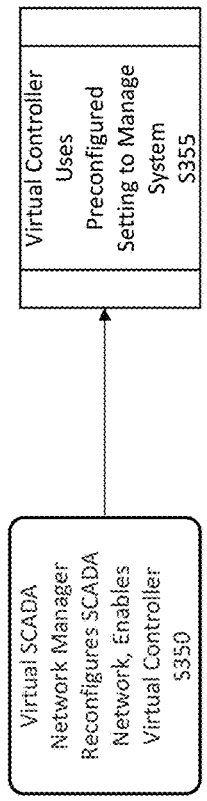

FIGS. 3A and 3B illustrate flow charts of the failover method in accordance with aspects of the disclosure. At S300, the SCADA network is in a normal state. Normal state means that a fault has not been detected in the physical controller 105. In other aspects, normal state may mean that a fault has not been detected in either of the physical controller 105 or IEDs 200. At S305, a fault occurs in the substation, e.g., onsite. For example, the fault may occur in the physical controller 105. "Remote Location" in FIG. 3A refers to a location separate from the utility control center 125.

Figure 4A:
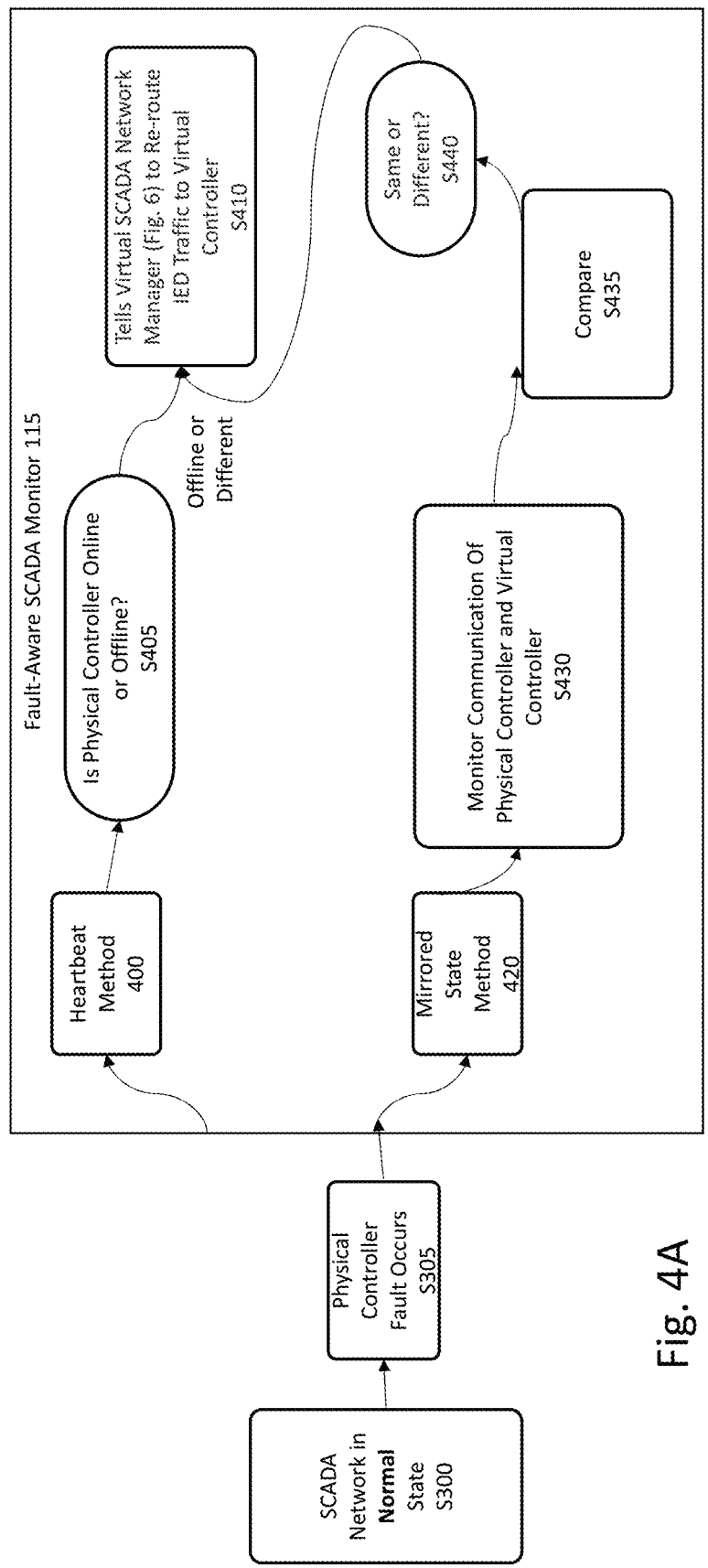
FIG. 4A illustrates a flow chart for detecting a failure in the physical controller and rerouting traffic to a virtual SCADA controller in accordance with aspects of the disclosure.

At S310, the fault is detected. FIG. 4A illustrates a flow chart of a method of detecting a fault and instructing the reconfiguration of the programmable network routing device 110 in accordance with aspects of the disclosure. In an aspect of the disclosure, the fault may be detected using one or more detection methods. For example, a heartbeat method 400 may be used to detect a fault. In this aspect of the disclosure, the physical controller 105 periodically transmits a heartbeat to the utility control center 125. In an aspect of the disclosure, the period may be every minute. In other aspects, the period may be shorter such as every second or tenth of a second. The period may be based on the application of the system and criticality. Since the fault-aware SCADA monitor 115 is connected to a TAP or SPAN port of the programmable network routing device 110, the fault-aware SCADA monitor 115 overhears the periodic heartbeat. When an expected heartbeat is not overheard, this may indicate that physical controller 105 is offline. When the physical controller 105 is determined to be offline, the fault-aware SCADA monitor 115 may report a fault at S410 to the virtual SCADA network manager 120.

In an aspect of the disclosure, when a single expected heartbeat is missed, the fault-aware SCADA monitor 115 determines that the physical controller 105 is offline. In other aspects of the disclosure, the fault-aware SCADA monitor 115 may determine that the physical controller 105 is offline after a preset number of expected heartbeats are missed. For example, the preset number may be 5 or 10 heartbeats in a row. This may be used to avoid triggering a failover when there is no fault at the physical controller 105. In other aspects, the fault-aware SCADA monitor 115 may determine a fault (such as an offline state), when a number of non-consecutive heartbeats are missed within a period of time. When several heartbeats are missed even if they are not consecutive, this may indicate network difficulty with the physical controller 105 or a failure. The number of heartbeats or period of time may be application specific and can be customized as needed. For example, the number of heartbeats or period of time may depend on factors such as the critically of the components or system, and the heartbeat rate. For example, if the heartbeat rate is 1 per second, missing a certain number of heartbeats is more important that when the heartbeat rate is 100 per second.

Figure 8:
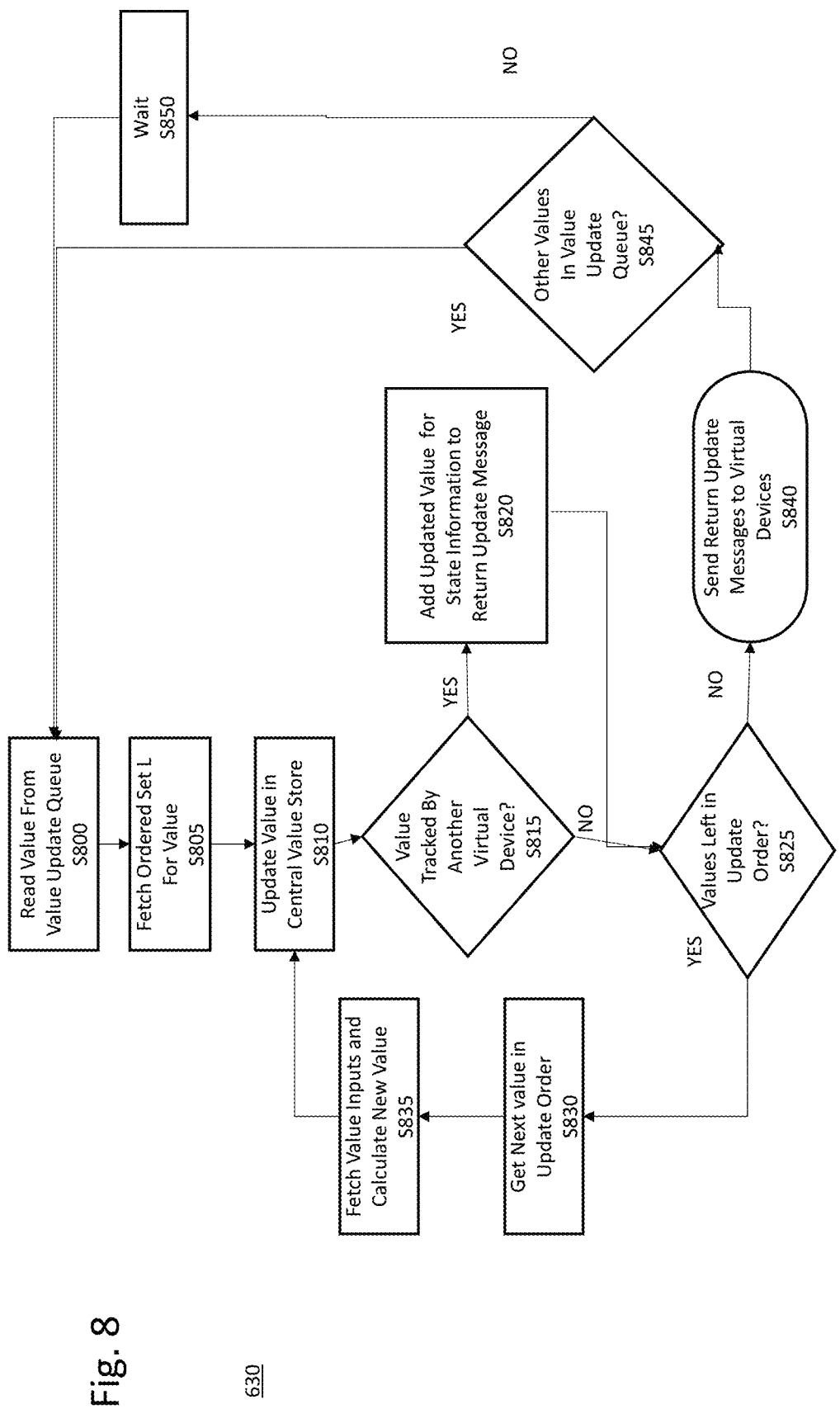
FIG. 8 illustrates a flow chart for updating information in accordance with aspects of the disclosure.

In another aspect of the disclosure, the fault-aware SCADA monitor 115 may determine a fault using a mirrored state method 420. Once again, since the fault-aware SCADA monitor 115 is connected to a TAP or SPAN port of the programmable network routing device 110, the fault-aware SCADA monitor 115 overhears the network traffic. In this case, the fault-aware SCADA monitor 115 overhears the state information determined by the physical controller 105 and state information updated by the virtual SCADA controller 100 as well as information sent to the utility control center at S430. State information used means the values of registers in the IEDs 200 or other downstream devices reporting to the physical controller 105 or values representing a state of the physical world stored in a memory of the IEDs 200. In this aspect of the disclosure, even though the virtual SCADA controller 100 is not controlling the IEDs 200 (actively) and the bidirectional port is disabled, the virtual SCADA controller 100 updates the state information as if it was actively controlling the IEDs (in a similar manner as shown in FIG. 8, however, the return update message is not sent). The virtual SCADA controller 100 would also be connected to a TAP or SPAN port of the programmable network routing device 110. Updating the state information will be described later in detail. The updating of the state information is based on the state information received from the IEDs 200 and control information received from the utility control center 125. Updated state information is an example of the second information and information to the utility control center 125 is an example of first information. The information to the utility control center 125 may be the same as the updated state information. The information to the utility control center 125 may be determined based on the state information, the updated state information and a combination thereof.

At S435, the fault-aware SCADA monitor 115 compares the first information (transmitted from the physical controller 105 to the utility control center 125) with the first information (determined by the virtual SCADA controller 100). When they are the same, there is no fault determined at S440. However, when there is a difference, fault-aware SCADA monitor 115 determines that there is a fault at S440 and reports the fault to the virtual SCADA network manager 120 at S410.

The fault-aware SCADA monitor 115 may use one or both of the heartbeat method 400 and the mirrored state method 420 to determine a fault.

In an aspect of the disclosure, in S410, the fault-aware SCADA monitor 115 instructs the virtual SCADA network manager 120 to automatically reconfigure the programmable network routing device 110 to enable the bidirectional port that the virtual SCADA controller 100 is connected to and disable the bidirectional port that the physical controller 105 is connected to at S350.

Figure 4B:
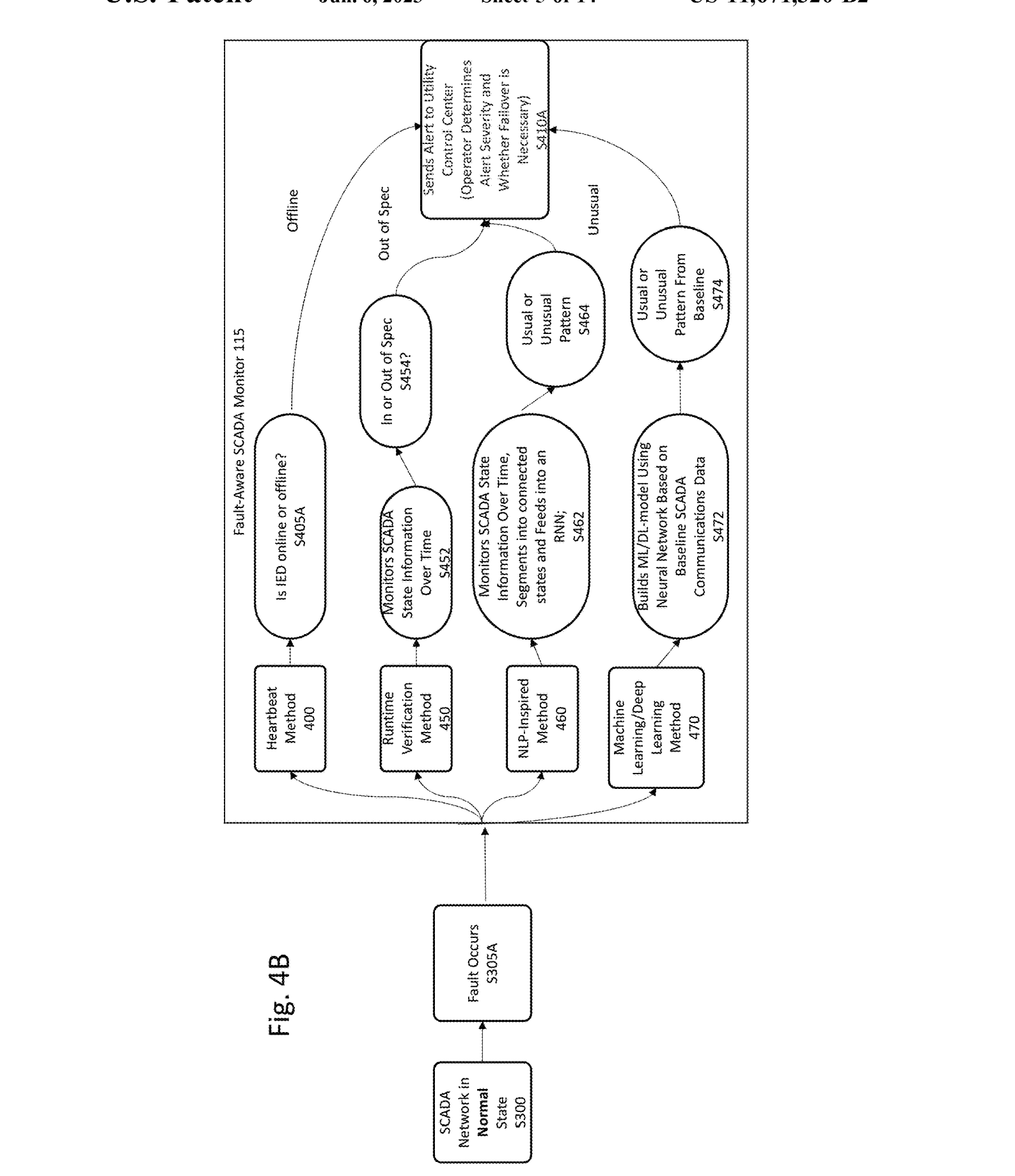
FIG. 4B illustrates a flow chart for detecting a failure in accordance with other aspects of the disclosure.
Figure 4C:
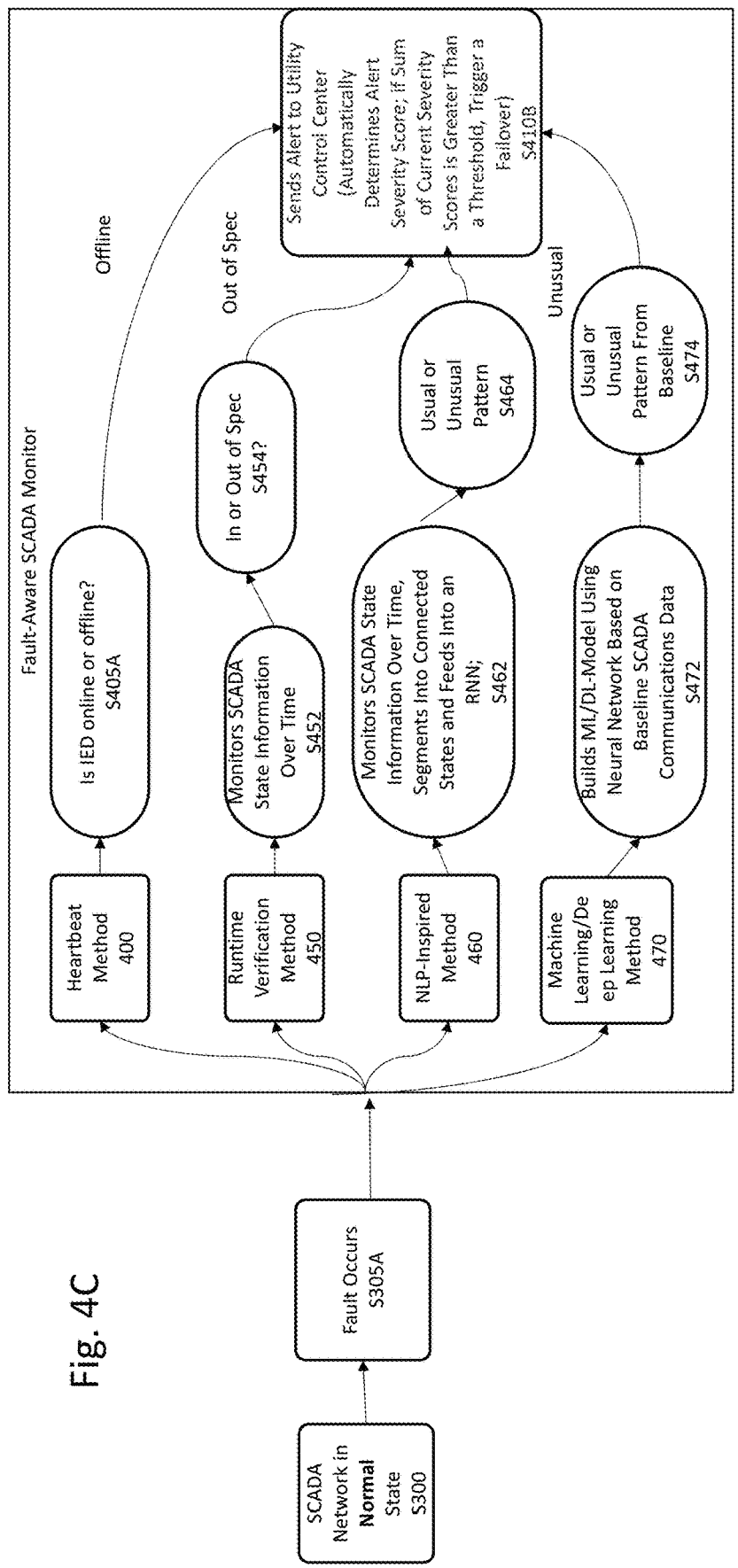
FIG. 4C illustrates a flow chart for detecting a failure in accordance with other aspects of the disclosure.

In another aspect of the disclosure, the fault-aware SCADA monitor 115 transmits a fault indication to the utility control center 125 instead of reporting the fault and instructing the virtual SCADA network manager 120 such as shown in FIG. 4B or FIG. 4C.

In an aspect of the disclosure, one or more methods may be used to determine whether to send an alert to the utility control center 125. At S305A, a fault occurs after operating in a normal state at S300. FIGS. 4B and 4C show multiple methods for determining whether to send the alert, e.g., a fault occurs. In FIGS. 4B and 4C, the fault is not limited to the physical controller 105, but may also be in the IEDs 200s. A heartbeat method 400 similar to described above may be used. However, for the heartbeat method, the fault-aware SCADA monitor 115 may also determine whether a heartbeat from the IED 200 is missed. In accordance with aspects of the disclosure, each IED periodically transmits a heartbeat with data to the physical SCADA controller 105, which is overheard by the fault-aware SCADA monitor 115.

Methods for determining a fault may include one or more of a runtime verification method 450, a NLP-inspired method 460 and machine learning (ML)/Deep learning (DL) method 470. In this aspect of the disclosure, fault-aware SCADA monitor 115 may use a memory for storing information. For example, when the runtime verification method 450 is used, the memory may store specifications. The specification may be a value or range of values for the state information. For example, where a register stored state information related to a temperature sensed by a sensor, the specification may include an allowable temperature range. In other aspects of the disclosure, the specification may include any number of predefined formal requirements that the utility system should maintain. For example, the specification may include if a command to open a valve is sent, the valve should be open during the next check/poll. The specification may be predefined by system operators/engineers with a formal specification such as, but not limited to, a Büchi automaton. The specification may also include parameters or items for code that runs on a physical controller 105 or the virtual controller 100 as well as a transformation plugin code. Behavior that breaks the written specification would indicate a bug in the software. The bug may be triggered accidentally or be an indication of a malicious exploit. Either way, with the runtime verification method 450, the fault-aware SCADA monitor 115 may detect the specification being broken and issue a notification which can then be remediated.

Since the fault-aware SCADA monitor 115 is connected to a TAP or SPAN port of the programmable network routing device 110, the fault-aware SCADA monitor 115 overhears the network traffic. In this case, the fault-aware SCADA monitor 115 overhears the state information determined by the physical controller 105. At S452, the fault-aware SCADA monitor 115 monitors the state information (including the updated state information). The fault-aware SCADA monitor 115 compares the state information (including the updated state information) transmitted as network traffic with the specifications in the memory, respectively. When the state information (including the updated state information) is within the specification at S454, there is no fault and thus an alert is not sent to the utility control center 125. However, when the state information (including the updated state information) is outside the specification (for that value) at S454, the fault-aware SCADA monitor 115 determines a fault and sends an alert to the utility control center 125 at S410A.

When a natural language processing (NLP)-inspired method 460 is used, the memory may store historical state information (including the updates). Since the fault-aware SCADA monitor 115 is connected to a TAP or SPAN port of the programmable network routing device 110, the fault-aware SCADA monitor 115 overhears the network traffic. In this case, the fault-aware SCADA monitor 115 overhears the state information determined by the physical controller 105. In this aspect of the disclosure, the historical state information may be divided into time segments. Each segment representing a period of time. For example, each segment may be 5-10 seconds long. In an aspect of the disclosure, each segment may be based on the time between requests to/from the IEDs 200. The time for each segment may be application based and depend on factors such as critically and rate of change of the state information. The fault-aware SCADA monitor 115 may further comprises a recurrent neural network (RNN). The RNN may be used to predict value or ranges for values of the state information (including the updated state information) based on the segmented historical state information at S462. When the transmitted network traffic, e.g., state information, is within the predicted value or range for the state information (including the updated state information) at S464, there is no fault and thus an alert is not sent to the utility control center 125. However, when the state information (including the updated state information) is outside the predicted value or range (for a particular state information) at S464, (e.g., unusual pattern is detected) the fault-aware SCADA monitor 115 determines a fault and sends an alert to the utility control center 125 at S410A.

When a machine learning/Deep learning method 470 is used, the memory may store historical state information (including the updates) and a trained model. The model may be trained from actual state information and updated state information over a training period, such as one week on a known good system. Known good means we have set up and validated the system to ensure there are no issues. The system may also be disconnected from the internet/utility network to prevent potential intrusions during this time that would invalidate the system and training. The training period may be based on the irregularity of the state information and other information. The training/testing is for an anomaly detection.

In FIG. 4B, the operator at the utility control center 125 receives the alert and may determine the severity of the fault. In an aspect of the disclosure, the alert may include information regarding the method used to determine the fault, e.g., heartbeat method 400, runtime verification method 450, NLP-inspired method 460 and ML/DL method 470 and data regarding the deviation or fault such as number of heartbeats missed, difference between received state information and specification value or range, change over time, difference from predicted value or change, and difference from baseline.

If the operator determines from the alert that a failover is needed, the operator may cause the utility control center 125 to issue an instruction to the virtual SCADA network manager 120 to reconfigure the programmable network routing device 110 at S350.

In other aspects of the disclosure, a processor at the utility control center 125 may automatically determine whether to issue an instruction to the virtual SCADA network manager 120 using the alert transmitted at S410B (See FIG. 4C). For example, a processor at the utility control center 125 may calculate an alert severity score. The alert severity score may be higher when multiple different methods (e.g., heartbeat method 400, runtime verification method 450, NLP-inspired method 460 and ML/DL method 470) triggered an alert. The alert severity score may also be higher based on a magnitude of a change or difference between an expected value and the actual state information (e.g., difference between spec and state information received). In an aspect of the disclosure, the alert severity score may be based on the specific state information or specification which triggered the anomaly. For example, the score may be higher when the state information or specification is more critical to the system. For example, a weather station could generate an alert for a particularly hot day, but this is not as critical as a breaker being open when it should be closed or vice versa. In an aspect of the disclosure, each specification item or state information may be assigned a specific weighing or multiplier. In other aspects of the disclosure, when the heartbeat method 400 is used, each IED 200 may be assigned a specific score and when the heartbeat is missed as described above, the specific score is added. The specific score may be based on the criticality to the system. A missed heartbeat with data from an IED may indicated that the physical controller 105 is compromised such as by causing a denial— of service attacked against the IED 200. For example, the physical controller 105 may be hacked or software placed on the same which either sends out data to an IED which it does not know how to respond to and thus causes it to go offline or the physical controller 105 may send a flood of data to the IED was a result of the hacking, also causing the IED to go offline.

The processor may compare the calculated alert severity score with a threshold. In an aspect of the disclosure, the threshold may be based on the application and criticality of the system. When the calculated alert severity score is larger than the threshold, the processor may automatically issue an instruction to the virtual SCADA network manager 120 to reconfigure the programmable network routing device 110 at S350.

In an aspect of the disclosure, the virtual SCADA network manager 120 may also issue an instruction to the virtual SCADA controller 100 to start operation in response to receiving the instruction from the utility control center 125. In an aspect of the disclosure, the instruction may also or instead come from the utility control center 125 directly to the virtual SCADA controller 100.

At S355, the virtual SCADA controller 100 manages the IEDs 200 and downstream components using preconfigured settings (e.g., receive control information and state information and updates the state information).

Figure 5A:
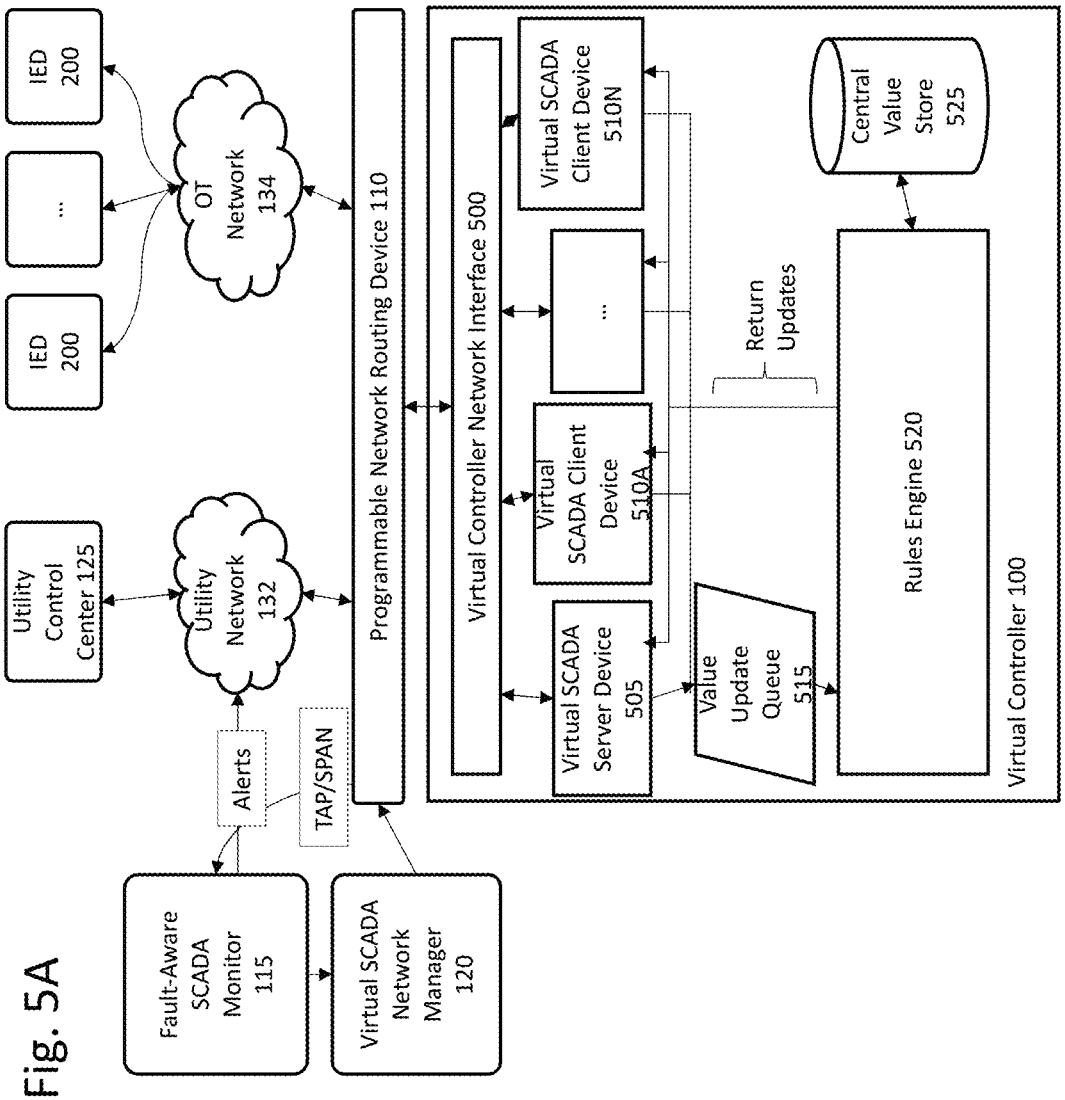
FIG. 5A illustrates a diagram of a virtual SCADA controller in accordance with aspects of the disclosure.

FIG. 5A illustrates a diagram of a virtual SCADA controller 100 in accordance with aspects of the disclosure. In FIG. 5A, certain other components of the system are shown for context. The virtual SCADA controller 100 may comprise a virtual controller network interface 500. The network interface 500 is the physical interface connected to one or more ports of the programmable network routing device 110. When the virtual SCADA controller 100 is implemented in a distributed manner, with a subset of modules or components located in different locations, the virtual SCADA controller 100 may have more than one virtual controller network interface 500.

The virtual SCADA controller 100 may comprise a virtual SCADA server device 505 and a plurality of virtual SCADA client devices 510A-510N. In a case where the utility control center 125 comprises multiple control systems (devices) and the different systems (devices) require different protocols, similar to client devices, there may be multiple server devices 505. For example, one virtual server device would serve the MODBUS client and another virtual server device would serve the DNP3 client. The virtual SCADA server device 505 is an example of a first module. The virtual SCADA client devices 510A-510N are examples of second modules. The virtual SCADA server device 505 interacts with the utility control center 125. The virtual SCADA client devices 510A-510N interact with the IEDs 200. The virtual SCADA server device 505 and the plurality of virtual SCADA client devices 510A-510N are virtual devices that may be deployed on one or more hardware devices, e.g., processors.

The virtual SCADA controller 100 may comprise a value update queue 515. The value update queue 515 may be a temporary storage for control information received from the utility control center 125 (which is used to update state information) as well as state information which needs to be updated (based on other state information).

The virtual SCADA controller 100 may comprise a rules engine 520. The rules engine 520 may be executed on one or more processors. The rules engine 520 processes the updates for the state information based on a defined order(s). The update of the state information is one at a time (based on the order).

The value update queue 515 is shared by all the virtual devices (e.g., virtual SCADA server device 505 and a plurality of virtual SCADA client devices 510A-510N). This enables low latency and allows updates to be ordered implicitly by the order they arrive at the virtual SCADA controller 100. In an aspect of the disclosure, the virtual SCADA client devices 510A-510N receive the state information from the IEDs 200 and return updated state information to the IEDs 200 (e.g., second information). The virtual SCADA server device 505 receives control information from the utility control center 125 and transmits first information upon request to the utility control center 125.

The rules engine 520 may store every value for the state information received and updated in a central value store 525. Since there is a full history of every value (state information and control information) at every time, the central value store 525 may be used for forensic investigation(s). In other aspects, the rules engine 520 may only store the latest values in the central value store 525.

The virtual SCADA controller 100 may also comprise a user interface (not shown in the figures). The user interface may be a web-based interface used to configure and/or monitor the virtual SCADA controller 100.

The virtual SCADA controller 100 may be deployed based on one or more configuration sections. The sections may be in one or more configuration files. These configuration sections may be generated prior to installation. In other aspects of the disclosure, the configuration sections may be updated after installation. For example, the configuration sections may be updated when new hardware such as another IED 200 is added to the system. The system may also comprise a configuration interpreter or parser 615. The parser 615 may be executed on one or more processors. In an aspect of the disclosure, the configuration sections may be in a text format and are not vendor-specific. Thus, unlike a physical controller 105 (which typically has vendor-specific software), the virtual SCADA controller 100 is configured without vendor-specific software.

Figure 6:
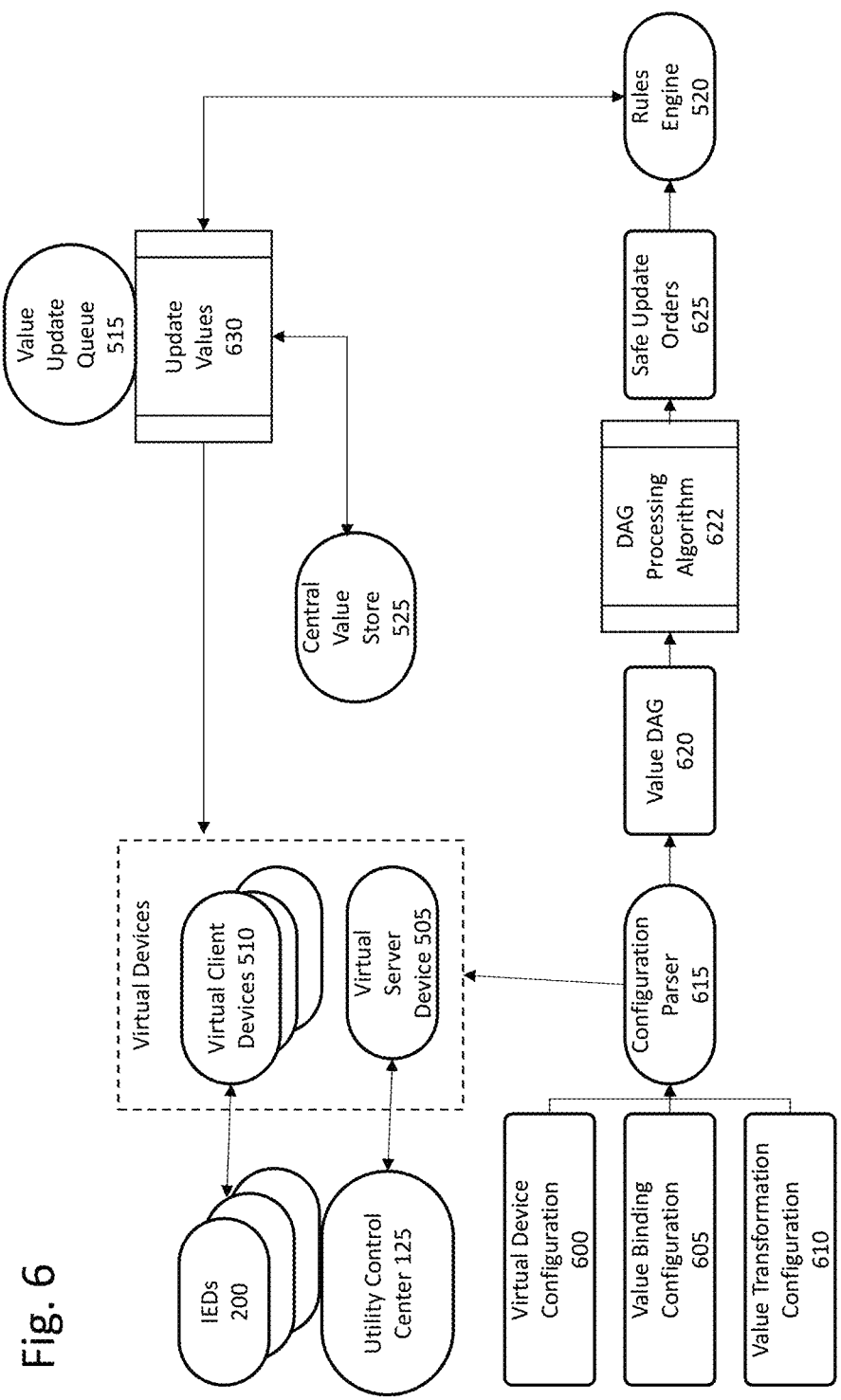
FIG. 6 illustrates a flow chart for the virtual SCADA controller in accordance with aspects of the disclosure.

FIG. 6 illustrates a flow chart and diagram of the virtual SCADA controller 100 in accordance with aspects of the disclosure. The flow shows features associated with set up and operation. As shown in FIG. 6, there are three configuration sections: virtual device configuration 600 (example of the first configuration information), value binding configurations 605 (example of the second configuration information) and value transformation configuration 610 (example of third configuration information).

The virtual device configuration 600 is used by the configuration parser 615 to deploy the virtual devices, e.g., virtual server device 505 and virtual client devices 510A-510N. The virtual device configuration 600 may comprise of one or more sub-configuration sections, each containing configuration information for each virtual device. The configuration parser 615 may deploy a virtual device for each virtual device sub-configuration section. Sub-configuration sections for each virtual device contain the protocol the virtual device will use to communicate and whether the virtual device will act as a virtual server 505 or virtual client 510A-510N. When virtual device sub-configuration section denotes the virtual device is acting as a virtual client 510A-510N, the sub-configuration section may also include the unique network identifier and TCP/UDP port for the server running on the interfacing IED 200. As noted above, the protocol may be MODBUS and DNP3. In an aspect of the disclosure, the configuration parser 615 will deploy one virtual client device 510 for each protocol. For example, the configuration parser 615 may deploy one virtual client device 510A for MODBUS and another virtual client device 510B for DNP3. In other aspects of the disclosure, each IED 200 may have its own virtual client device 510. When the virtual device sub-configuration section denotes the virtual device is acting as a virtual server 505, the virtual device sub-configuration must also include the network identifier of the interface(s) and the TCP/UDP port number on which the utility control center 125 uses to access information and issue control information to the IEDs 200 via the virtual SCADA controller 100.

Within the sub-configurations of each virtual device, the values to be tracked/served by virtual client/server must also be configured in sub-sub-configurations per value. External identifiers (I. E. protocol addresses), internal identifiers (unique string of text mapped to a memory location), and datatypes may be provided for each of the values tracked/served by each virtual device.

The value binding configuration 605 may comprise information declaring intermediate values not tracked directly by any virtual device 505/510. Intermediate values are only associated with the central database 525 and not with a virtual device 505/510 (so no IP address or TCP port is given, just a data type and default value). The value binding configuration 605 may also comprise information indicating the relationship between the state information(s) from the one or more source values and one destination value. In addition to the source value(s) and destination value, a binding also may include the transformation to apply between the source(s) and the destination. For example, if an intermediate value is defined as the product of a value from one IED and another value from another IED, the binding would include the internal identifiers for the IED values as the source values, the internal identifier for the destination value, and an identifier for a transformation which takes the two values as input and outputs the product.

Each value in the virtual server 505 may have a unique identifier and each value in the clients 510 has a unique identifier. The identifier for a value in the server is linked to an identifier for a value in a client within the value binding configuration 605.

Figure 7A:
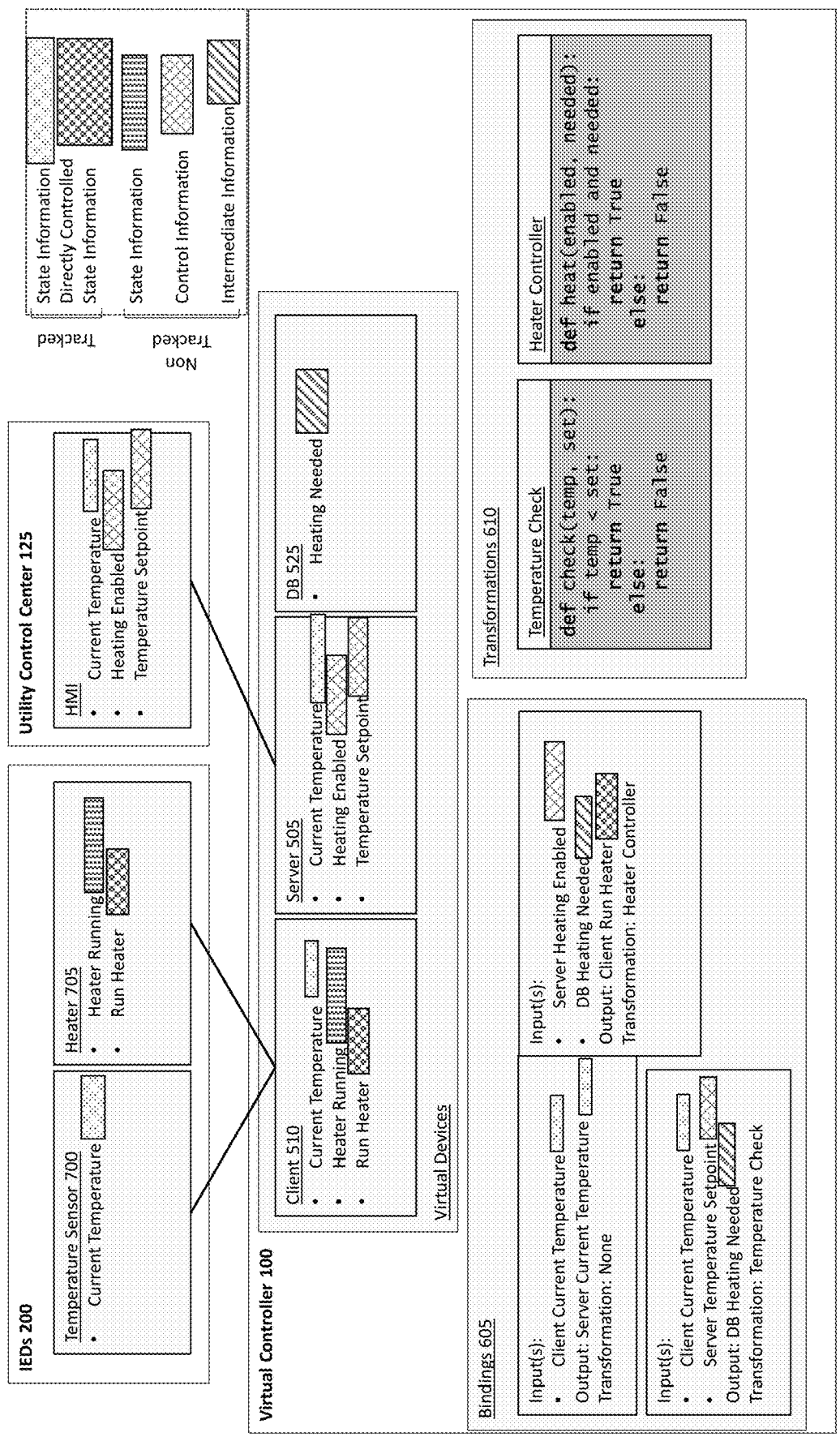
FIG. 7A illustrates an example of the value binding configurations and transformations where the system includes a utility control center and two IEDs.

If no transformation is provided, there must be only one source value. In this case a default transformation is applied which sets the destination value to the source value. FIG. 7A illustrates an example of the value binding configuration 600 and transformations 610 where the system includes a utility control center 125 and two IEDs 200. In the example, the two IEDs are a temperature sensor 700 and a heater 705. One virtual SCADA client device 510 is deployed for both IEDs 200. The state information for the temperature sensor 700 includes the current temperature (tracked). The state information for the heater 705 includes heater running (which is non-tracked state information). Non-tracked state information is information that is only tracked by the virtual SCADA client that receives the state information from the IED 200 and no other virtual SCADA client or virtual SCADA server 505. The control information sent to the heater 705 include run heater (referred to herein as directly controlled state information). Directly controlled state information is the state information which is determined based on the control information from the utility control center 125. This is different from other state information which may be a sensed or measured value which results from the IED 200 implementing the directly controlled state information. For example, run heater causes the heater to run which changes the current temperature. The binding associates the current temperature (state information) for the virtual SCADA client 510 (source) and virtual SCADA server 505 (destination). There is no transformation needed. Another binding associates the control information from the utility control center heating enabled and its source (virtual SCADA server 505) and the control information to the IED "run heater" as the destination (virtual SCADA client 510). The same binding includes the immediate information "heating needed" which is only associated with the central database 525. This binding may also include the identifier for the transformation, e.g., heater controller.

FIG. 7A also shows another binding between the current temperature (state information), where the source is the virtual SCADA client 510 (from the heater 705) and the temperature setpoint (control information), which is also a source (via the virtual SCADA server 505). The destination is the database and the intermediate value "heating needed". The binding also includes the transformation, e.g., temperature check. Source and Input are used interchangeably. Destination and output are used interchangeably.

The configuration parser 615 parses the value binding configuration 605 to construct the value dependency graph 620 in memory. Each value defined in the virtual device configuration (state information) and intermediate value in the binding information (also referred to as intermediate state information) is a node in the graph. Each binding in the binding configuration draws directed edges from the source value(s) to the destination value of the binding. An edge from a node A to a node B indicates that the value of node A is necessary in the calculation of node B. The value dependency graph 620 is used as input to a directed acyclic graph (DAG) processing algorithm 622 to determine safe update orders 625 for each node (value) in the graph. It also ensures the graph is acyclic. The rules engine 520 determines the safe update orders.

The value transformation configuration 610 may comprise the mathematics or calculations used to update one or more state information based on one or more other state information and/or control information. For example, one value of state information may indicate a specific temperature (change). A change in the temperature may impact the flow rate or pressure. The value transformation configuration 610 may include a formula to calculate the change in pressure needed to account for a change in temperature. The value transformation configuration 610 may also include transformations or calculations specific for a protocol.

The value transformation configuration also includes identifiers to each defined formula or calculation, so that they may be referenced by the value binding configurations 605. FIG. 7A shows two examples of transformations, e.g., temperature check and heater controller. Other examples of the transformations include LessThan( ) GreaterThan( ) Equal( ) Add( ) Subtract( ), Divide( ) and more complex calculations such as PIDControl( ) (proportional-integral-derivative). For protocol-specific transformations, the transformations may include multiplier to convert a float value to an integer. For example, the value 3.14 would be stored as 314 and the multiplier is 0.01, so the transformation would be Multiply (314, 0.01)=3.14.

In an aspect of the disclosure, the directed acyclic graph (DAG) processing algorithm 622 is a depth-first search. A depth-first search starts at a root node and moves downward (assuming it starts at a top of a tree) along a branch until the branch ends, until the search returns to the root node. A particular branch to traverse may be random.

Figure 7B:
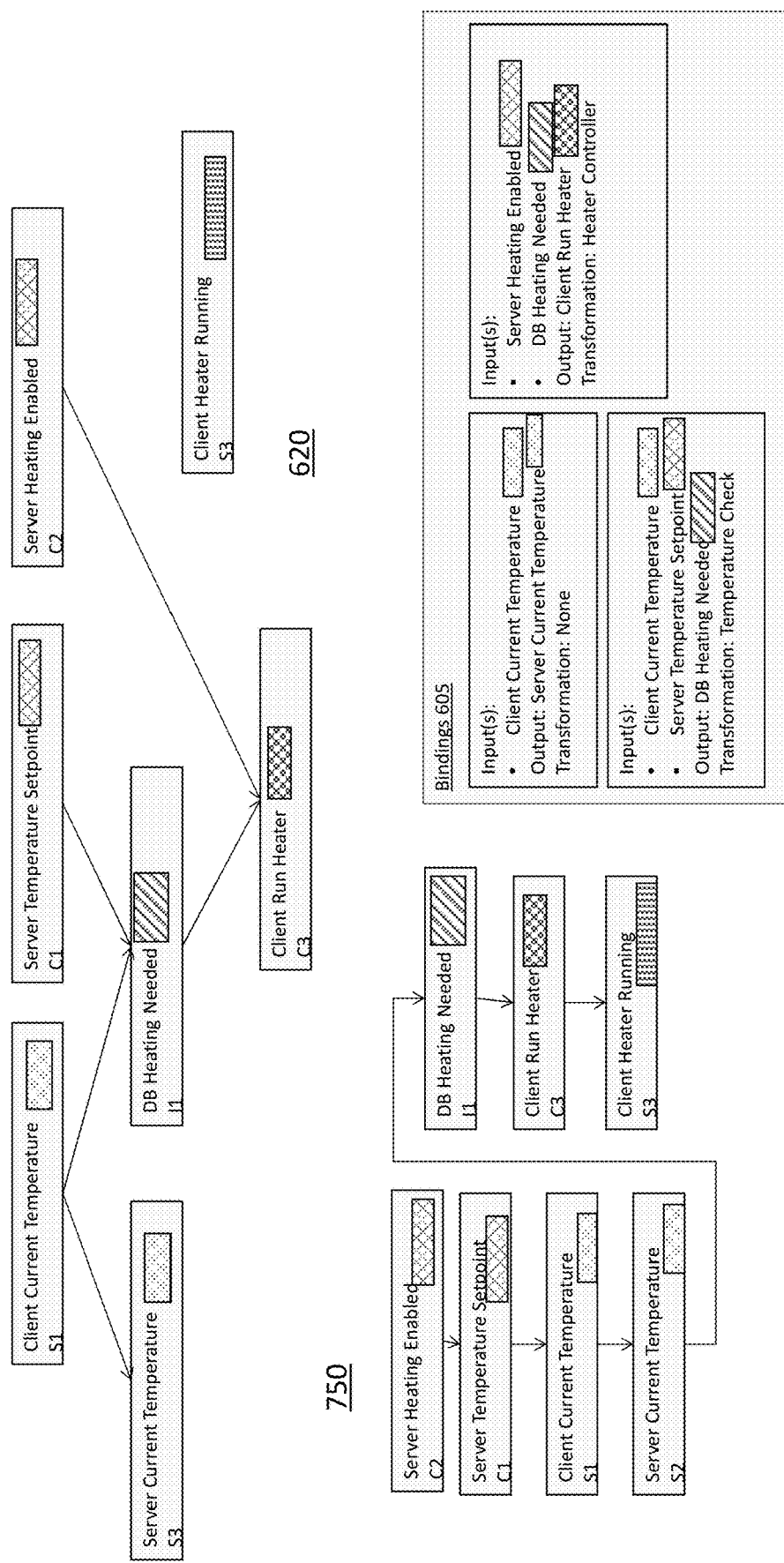
FIG. 7B illustrates an example of a master safe update order, a value dependency graph for the example of the value binding configurations shown in FIG. 7A, the same binding configurations being shown in FIG. 7B as well.

FIG. 7B illustrates an example of a master safe update order 750 determined in accordance with aspects of the disclosure and a value dependency graph 620 for the example of the value binding configuration shown in FIG. 7A. FIG. 7B also shows the value binding configuration for comparison. As shown on the top of FIG. 7B, the sources from virtual SCADA server 505, e.g., heating enabled C2, and temperature setpoint C1, point to lower nodes such as heating needed I1 (which is an intermediate information) and run heater C3 (associated with the virtual SCADA client 510). The state information such as current temperature S1 (associated with the virtual SCADA 510) (source) point to lower nodes, current temperature (destination: virtual SCADA server 505) and heating needed I1 (destination: central database 525).

FIG. 7C illustrates an example of master safe update order 750 and individual node update orders 625 for each node in accordance with aspects of the disclosure. The master safe update order 750 in FIGS. 7B and 7C is the same. FIG. 7C also show examples of individual safe updated orders 625 (order set L), e.g., N=seven. As noted above, DAG processing algorithm iterates through the DAG and adds dependent values to a list for that value's safe update order in the same order as they are listed in the master update order.

The individual safe update orders 625 may also be stored in memory for subsequent use by the rules engine 520. In an aspect of the disclosure, the ordered set L for each of the N nodes is stored in the central value store 525.

There may be a one-to-one correspondence between nodes in the value dependency graph and the individual safe update orders 625. In FIGS. 7A-7C the different types of information are identified by different patterned rectangles next to the information. The legend is shown in FIG. 7A. For example, the figures show "tracked" information, e.g., state information (identified with a dotted rectangle) and directly controlled information (identified with patterned rectangles within a rectangle) and "not tracked" information, e.g., state information (identified by patterned vertical lines within a rectangle), control information (identified by diagonal hashing within a rectangle going in different directions) and intermediate information (identified by diagonal hashing within a rectangle, going in the same direction).

FIG. 8 illustrates a flow chart for updating information including state information based on the safe update orders 625 in accordance with aspects of the disclosure. The steps described in FIG. 8 are executed by one or more processors functioning as the rules engine 520.

At S800, the rules engine 520 obtains a piece of information from the value update queue 515. The piece of information may be state information from an IED 200 (or control information which triggers and update of directly controlled state information). In an aspect of the disclosure, the processing may be based on a first-in-first out method, where the first piece of information received is processed first. The determination of the first piece of information received may be based on a time stamp. In other aspects of the disclosure, the processing order for the information in the value update queue 515 may be based on the communication latency of the IEDs 200. The piece of information is taken as the root node for L. For example, information may be processed first where the communication speed is higher and/or the latency is lower.

At S805, the rules engine 520 retrieves the ordered set L for the information (for processing) (e.g, safe update order 625 for the piece of information). In an aspect of the disclosure, any information in the queue is a root node of one of the ordered sets L. For example, if the item in the value update queue 515 is "heating enabled" C2, the rules engine 520 retrieves the update order "heating enabled C2→client Run heater C3".

At S810, the rules engine 520 updates the value. In this case, the rules engine 520 stores in new value for the heating enabled in the central value store 525. For example, the heating enabled may change from "0", e.g., OFF to "1", e.g., ON.

However, for subsequent passes, in an aspect of the disclosure, the rules engine 520 may retrieve the value transformation configuration 610 associated with the piece of information that it is processing. Specifically, the rules engine 520 may retrieve the calculation or function needed to update the value from the value transformation configuration 610 (if any). In an aspect of the disclosure, when the piece of state information is dependent on other piece of information, such as intermediate information, the rules engine also obtains the other information required for calculation. The rules engine 520 may obtain the most recent information from the central value store 525 needed for the update. For example, if node 3 is being processed for an update and node 3 depends on nodes 1 and 2, the rules engine 520 may obtain the values of node 1 and node 2 from the central value store 525.

The rules engine 520 executes the calculation or function needed to update the value. In some aspects, depending on the protocol used generate the state information in an IED 200, the rules engine 520 may also retrieve protocol specific transformations which are included in the value transformation configuration 610.

The updated value (e.g., state information) is stored in the central value store 525.

At S815, the rules engine 815 determines whether the information is tracked by a virtual device, e.g., virtual server device 505 or one of the virtual client devices 510A-510N. In an aspect of the disclosure, this determination may be made using the virtual device configuration 600 and the value binding configuration 605. As described above, the virtual device configuration 600 comprises identification information identifying the tracked information and the value binding configuration 605 may comprise information indicating the relationship between the state information(s) from the IED(s) 200 and information associated with the utility control center 125.

When the information is determined to be tracked by a virtual device, e.g., virtual server device 505 or one of the virtual client devices 510A-510N (YES at S815), the rules engine 520 adds the updated value for the state information to a return message (queue) at S820. The return message may be temporarily stored in memory. In the above example, heating enabled is not tracked by another virtual SCADA device and therefore, it may not be added to a return message. However, the rules engine 815 may issue a confirmation to the virtual SCADA server 505 that the value was updated.

If on the other hand, the information is not tracked by a virtual device e.g., virtual server device 505 or one of the virtual client devices 510A-510N ("NO" at S815), the rules engine 520 determines if there is another value that needs to be updated at S825. The rules engine 520 uses the same ordered set L previously obtained in S805 to determine if other values are dependent on the value just updated. For example, if node 5 depends on node 3 (and node 3 is updated), the value for node 5 needs to be updated. Using the example described above, "run heater" C3 is dependent on heating enabled. Therefore, the value of run heater may be updated.

If at S825, the rules engine 520, determines, based on the order set L that other values need to be updated (YES at S825), the rules engine 520 retrieves the value that needs to be updated from the central value store 525 at S830. For example, the rules engine 520 may retrieve the value for node 5 (if node 5 depends on node 3). In some aspects, this step may be omitted where the new value is independently determined from its previous value.

The rules engine 520 also obtains other values needed to calculate the update for the retrieved value (e.g., values needed to update node 5) at S835. Using the above example, the rules engine obtains the heating needed (intermediate value) from the central value store. Similar to above, the rules engine 520 retrieves the value transformation configuration 610 associated with the piece of state information that it is processing at S835. Specifically, the rules engine 520 retrieves the calculation or function needed to update the value from the value transformation configuration 610. The rules engine 520 also executes the calculation or function needed to update the value at S835. Using the above, example, the transformation is "heater Controller" and it rules engine 520 determines if the heater need to run. As shown in FIG. 7A if heating is enable and needed, the heater is controlled to run otherwise, the heater is controlled not to run. Therefore, even though heating enabled may be turn ON, if hearing is not needed, the heater may be controlled not to run. S810 the value for run heater C3 may be updated, e.g., stored in the central data store 525.

Further, as described above, depending on the protocol used generate the state information in an IED 200, the rules engine 520 may also retrieve protocol specific transformations which are included in the value transformation configuration 610. S815 is repeated for the processed value. When the state information is determined to be tracked by a virtual device, e.g., virtual server device 505 or one of the virtual client devices 510A-510N (YES at S815), the rules engine 520 adds the updated value for the state information to a return message (queue) at S820. Using the above example, since run heater is tracked by a virtual SCADA client 510, the updated value is added to return update message at S820S810-835 may be repeated for each value left in the safe update order 625 (determined from the obtained ordered set L in S805).

When there are no values left in the safe update order 625 (determined from the obtained order set L in S805), the rules engine 520 sends the return update message to the virtual server device 505 and/or the virtual client devices 510A-510N at S840. In an aspect of the disclosure, the rules engine 520 may generate separate update messages for the different virtual devices, e.g., the virtual sever device 505 and the virtual client devices 510A-510N at S820. Therefore, the virtual devices may only receive the relevant updates. For example, when the rules engine 520 determines at S815 that the value is tracked by one of the virtual devices, at the same time, the rules engine 520 determines which virtual device(s) is tracking the value based on the virtual device configuration 600. Thus, at S820, the rule engine 520 adds the updated value to the return update message for virtual device(s) that are tracking the value. In one aspect, only one different virtual SCADA device may be tracking a specific value. The return update message(s) are sent to the virtual device(s) using the mapped identifiers of the virtual device(s).

In other aspects of the disclosure, only one return update message may be sent to each virtual device. For example, the same return update message may be sent to all of the virtual devices. The virtual device upon receipt of the return update message may only obtain the relevant state information and ignore other state information that it is not tracking.

Once the return update message(s) are sent, the rules engine 520 determines if there are other values stored in the value update queue 515 that have not been processed at S845. When there are other values in the value update queue 515 (YES at S845), S800-S840 are repeated for each other value. On the other hand, when there are no other values in the value update queue 515 (NO at S845), the rules engine 520 waits at S850 until the value update queue 515 has a value.

For example, if first the utility control center 125 transmits the heating enabled control information C2 to the virtual SCADA server 505 and subsequently transmits the temperature setpoint C1, the heating enabled C2 is first updated in the central value store 525 and then the run heater C3 is updated in the central value store 525 and sent to the virtual SCADA client 510 as describe above, then the process is repeated for the temperature setpoint C1 (YES at S845). For example, at S800, the rules engine 520 reads the value of the temperature setpoint C1 and stores the value in the central value store 525 at S810. At S805, the rules engine 520 retrieves the ordered set L 625 for the temperature setpoint C1 (which is temperature setpoint C1→heating needed I1→run heater C3). At S815, the rules engine 520 determines that the temperature setpoint C1 is not tracked by another virtual SCADA device (e.g., virtual SCADA client 510) and moves to S825. At S825, the rules engine 520 determines that there are other items in the ordered set L 625 (safe update order), e.g., heating needed I1→run heater C3. At S830, the rules engine 520 may retrieve the stored heating needed. At S835, the rules engine 520 may retrieve other input needed. As shown in the binding information 605, another input is need, e.g., current temperature. Therefore, at S835, the rules engine 520 retrieves the current temperature stored in the central value store. Also, at S835, the rules engine retrieves the transformation "temperature check" and may calculate the heating needed. As shown in the transformation, when the current temperature is less than the temperature setpoint, heating is needed, e.g., true. The updated value, e.g., true, may be stored in the central value store at S810. Since heating needed is an intermediate value, the updated value is not added to the return update message (NO at S815). The rules engine may then repeat S825-S815 (and then S820) for the run heater C3 since there is another item in the ordered set L 625 (safe update order) that needs to be updated. Run heater C3 is determined using the updated value for the heating needed. Once the run heater C3 is updated, the rules engine 520 may transmit a conformation to the virtual SCADA server 505 and transmit the return update message to the virtual SCADA client 510.

In an aspect of the disclosure, when a value is read from the value update queue 515, the rules engine 520 deletes the value from the value update queue 515.

Figure 5B:
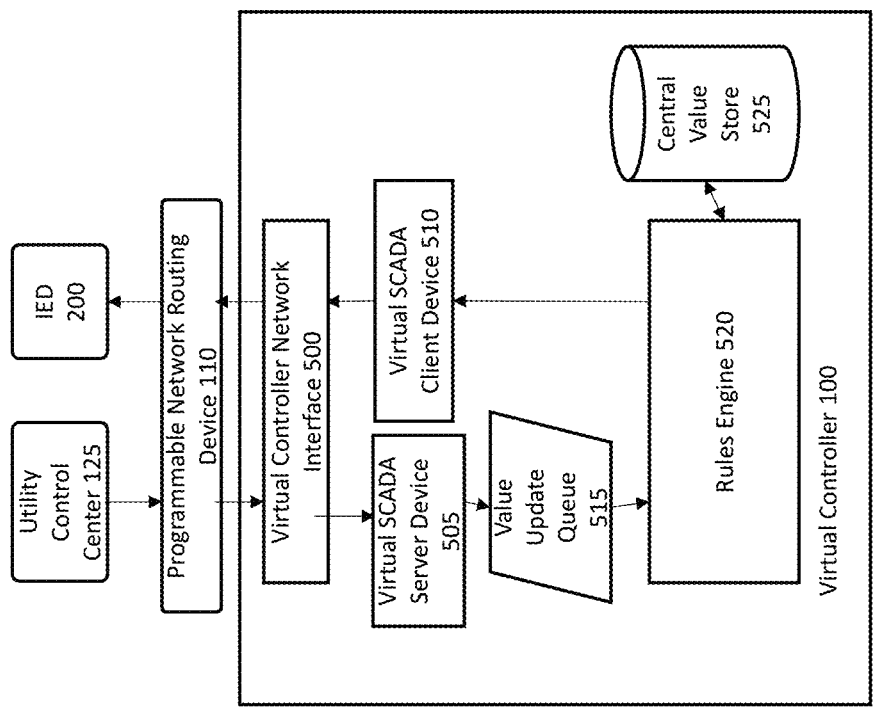
FIG. 5B illustrates traffic flow from the utility control center to an IED via the virtual SCADA controller in accordance with aspects of the disclosure.

FIG. 5B shows an example of traffic flow in accordance with aspects of the disclosure. A control instruction associated with one or more state information is sent by the utility control center 125 to the virtual SCADA controller 100 via the programmable network routing device 110 using the utility network 132 (e.g., control instruction: heating enabled C2 and/or temperature setpoint C1). The virtual SCADA controller 100 receives the control instruction at the virtual SCADA server device 505 (via the virtual controller network interface 500). For example, the utility control center 125 may transmit a control packet having the identifier of the virtual SCADA server device 505. When the virtual SCADA server device 505 receives the packet, the server device 505 extracts the instruction and adds the same to the value update queue.

When the virtual SCADA client device 510 receives the return update message (e.g., having run heater C3), the virtual SCADA client device 510 determines the final destination for the updated state information such as the directly controlled state information (destination e.g., IED 200) based on the virtual device configuration 600. For example, the virtual SCADA client device 510 may obtain the identifier of the IED 200 associated with the updated directly controlled state information. The virtual SCADA client device 510 transmits the updated state information to the IED 200.

Referring to FIG. 3A, at S315 the IEDs 200 can receive the correct updated directly controlled state information (based on a control information from the utility control center 125) through the virtual SCADA controller 100 even though the physical controller 105 is down.

Figure 5C:
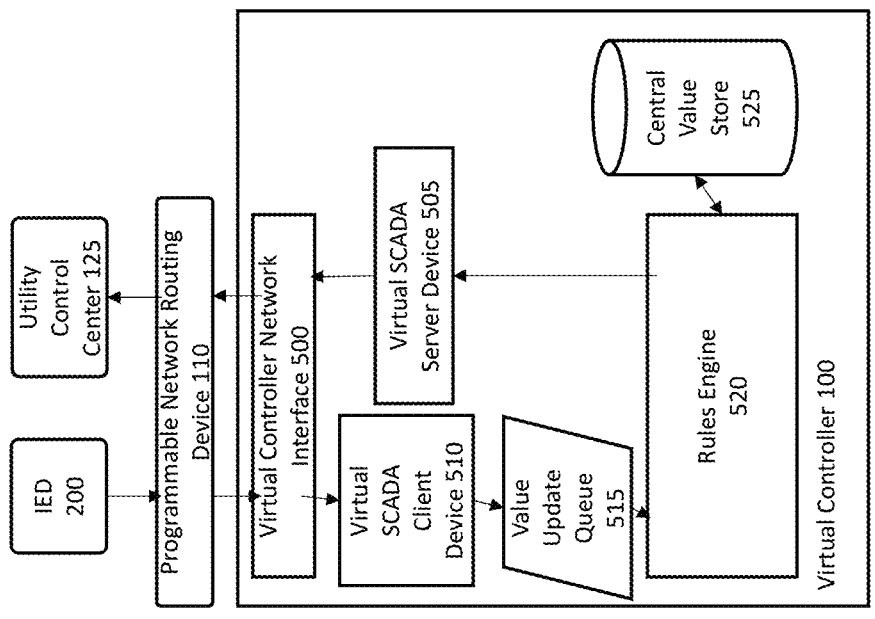
FIG. 5C illustrates traffic flow from the IED to the utility control center via the virtual SCADA controller in accordance with aspects of the disclosure.

FIG. 5C shows an example of traffic flow in accordance with aspects of the disclosure.

In this aspect of the disclosure, the IED 200 may transmit state information of one of its registers (e.g., current temperature) to the virtual SCADA controller 100 via the programmable network routing device 110 (and OT network 134). In an aspect of the disclosure the IED 200 transmits the state information unsolicited to the virtual SCADA client device 510 or in response to a request from the same. For example, the IED 200 may transmit the state information when the value is updated. The virtual SCADA controller 100 receives the state information at the virtual SCADA client device 510 (via the virtual controller network interface 500). The state information may be transmitted as a packet. In this case, the packet is not specifically directed to the virtual SCADA client device 510 (and the virtual SCADA controller 100), since the IED 200 is not aware of a fault. The packet from the IED 200 has a destination address of the physical SCADA controller 105 in the header. This address may be an IP address.

When the state information is received by the virtual SCADA client device 510, the virtual client device 510 add the state information to the value update queue. In some aspects of the disclosure, the state information is time-stamped with the time of receipt.

As described above with respect to FIG. 8, the rules engine 520 reads the value associated with the state information at S800 and updates the state information in the central value store 525. The state information may be added to the return update message for the virtual SCADA server device 505 if tracked by the virtual SCADA server device 505.

When the virtual SCADA server device 505 receives the updated state information, the server device 505 may store the same. The virtual SCADA server device 505 then waits for a request for the information from the utility control center 125 (e.g., a pull request). In an aspect of the disclosure, in response to receiving the request from the utility control center 125, the virtual SCADA server device 505 transmits information to the utility control center 125. The virtual SCADA server device 505 may use the identifier of the utility control center 125 in the virtual device configuration 600. In an aspect of the disclosure, the virtual SCADA server device 505 transmits the stored state information to the utility control center 125. In other aspect of the disclosure, the virtual SCADA server device 505 may transmit information associated or related to the stored state information. The information associated or related to the stored state information may be determined from the value binding configuration 605, e.g., information indicating the relationship between the state information(s) from the IED(s) 200 and information associated with the utility control center 125. The information related to the updated state information may be an offset from the controlled value and the actual value or a change in the state information between two consecutive periods.

In other aspects of the disclosure, the state information from one IED may cause a change in the state information in another IED with receiving control information from the utility control center 125. For example, one IED may sense pressure and the state information may be the sensed pressure. A second IED may have state information that is dependent on a sensed pressure. Therefore, when the sensed pressure in updated in the central value store 525, updated order 625 may indicate that the state information for the second IED needs to be updated. For example, when the sensed pressure is higher than a prior sensed pressure, a valve may need to be controlled, e.g., the state information related to the valve may need to be updated.

Advantageously, even though the physical controller 105 is faulty and down, in accordance with aspects of the disclosure, the utility control center 125 can still obtain the current state information or information associated with the current state information from the virtual SCADA controller 100.

Since both the IEDs 200 and the utility control center 125 are receiving the correct state information (and/or information associated with the state information), the SCADA network can quickly recover from a fault in the physical controller 105 (or other device) and operate in a normal state (even though there is a fault in the physical controller 105) at S320.

While the system is being controlled via the virtual SCADA controller 100, the operator at the utility control center 125 may send an engineer or maintenance person onsite to locate, fix or obtain the failed physical controller 105 at S325. Also, while the system is being controlled via the virtual SCADA controller 100, the engineer or maintenance person can determine the root cause of failure without impacting the functions of the system at S330.

Aspects of the disclosure provide a cost-effective failover response using a virtual SCADA controller 100 which enables a quick failover response in response to a fault detection. In other aspects, the virtual SCADA controller 100 may be used to provide a safe evaluation environment for training cyber first-responders and developing offensive technologies on one of most commonly deployed, centrally-located cyber-physical devices, e.g., physical controller 105.

As used herein terms such as "a", "an" and "the" are not intended to refer to only a singular entity, but include the general class of which a specific example may be used for illustration.

As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect.

Aspects of the present disclosure may be implemented and run on a general-purpose computer or special-purpose computer system. The computer system may be any type of known or will be known systems and may include a hardware processor, memory device, a storage device, input/output devices, internal buses, and/or a communications interface for communicating with other computer systems in conjunction with communication hardware and software, etc.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electro-magnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terms "computer system" and "network" as may be used in the present application may include a variety of combinations of fixed and/or portable computer hardware, software, peripherals, mobile, and storage devices. The computer system may include a plurality of individual components that are networked or otherwise linked to perform collaboratively, or may include one or more stand-alone components. The hardware and software components of the computer system of the present application may include and may be included within fixed and portable devices such as mobile phone, tablet, smartphone, desktop, laptop, and/or server. A module may be a component of a device, software, program, or system that implements some "functionality", which can be embodied as software, hardware, firmware, electronic circuitry, or etc.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually. For example, multiple processors may allow load balancing. As used herein, the term "processor" may be replaced with the term "circuit". The term "processor" may refer to, be part of, or include processor hardware (shared, dedicated, or group) that executes code and memory hardware (shared, dedicated, or group) that stores code executed by the processor.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A system comprising: a reprogrammable network-routing device connected to a physical supervisory control and data acquisition (SCADA) controller and two or more intelligent-electronic devices (IEDs), the physical SCADA controller and the IEDs being members of an operational technology (OT) network; a fault-monitoring module configured to tap into a port of the reprogrammable network-routing device to detect a failure of the physical SCADA controller; and a network-manager module configured to: decouple the physical SCADA controller from the IEDs by reprogramming the reprogrammable network-routing device; and control the reprogrammable network-routing device such that bidirectional communication between the IEDs and a controller module is enabled.

2. The system of claim 1, wherein the fault-monitoring module is configured to detect a failure of the physical SCADA controller based on at least one of a heartbeat from the physical SCADA controller, state information from the IEDs, and updated state information from the physical SCADA.

3. The system of claim 2, wherein the controller module is configured to tap into a port of the reprogrammable network-routing device to receive the state information from the physical controller and the IEDs and control information from a monitoring device prior to a detection of failure, and wherein the controller module configured to calculate its own updated state information from the state information and the control information, wherein when the updated state information received from the physical SCADA controller and the calculated own updated state information is different, the fault-monitoring module detects a failure.

4. The system of claim 2, wherein the fault-monitoring module is configured to detect a failure of the physical SCADA controller when the heartbeat is not received from physical SCADA controller.

5. The system of claim 3, wherein the network-manager module is further configured to instruct the controller module to uninterruptedly take over control of the IEDs based on the state information from the IEDs determined by the controller module when the failure is detected.

6. The system of claim 2, wherein the fault-monitoring module is configured to transmit an alert to a monitoring device in a monitoring station in response to a detection of the failure in the physical SCADA controller.

7. The system of claim 1, wherein the fault-monitoring module is further configured to determine whether an alert should be sent to a monitoring device in a monitoring station based on state information of the IEDs.

8. The system of claim 7, wherein the fault-monitoring module determines that the alert should be sent when the state information from the IEDs is outside a preset specification or an anomalous pattern is detected.

9. The system of claim 8, wherein the fault monitoring module executes a machine learning module, which is trained based on the state information from the IEDs for a first period of time, wherein the fault monitoring module determined whether the alert should be sent based on a comparison between the received state information from the IEDs in a second period and a model determined from the state information for the first period of time.

10. The system of claim 8, wherein the network-manager module causes the controller module to take over control of the IEDs based on instruction received from the monitoring device determined from the received alert.

11. The system of claim 1, wherein the fault-monitoring module and the network-manager module are members of a control network, the control network being different from the OT network.

12. The system of claim 1, wherein the system is part of a utility.

13. The system of claim 12, wherein the fault-monitoring module, the network-manager module and the reprogrammable network-routing device are located in a first building and wherein the controller module is located in at least a second building remote from the first building.

14. The system of claim 1, wherein the network-manager module is further configured to instruct the controller module to take over control of the IEDs when the failure is detected.

* * * * *